(12) United States Patent
Franey et al.

(10) Patent No.: US 12,253,371 B2
(45) Date of Patent: Mar. 18, 2025

(54) DYNAMIC ROUTING OF AUTONOMOUS VEHICLES

(71) Applicant: Ocado Innovation Limited, Hatfield (GB)

(72) Inventors: Catherine Jones Franey, Waltham, MA (US); Jeffrey Larson, Ashland, MA (US)

(73) Assignee: Ocado Innovation Limited, Hatfield (GB)

( * ) Notice: Subject to any disclaimer, the term of this patent is extended or adjusted under 35 U.S.C. 154(b) by 124 days.

(21) Appl. No.: 17/342,932

(22) Filed: Jun. 9, 2021

(65) Prior Publication Data

US 2022/0397404 A1 Dec. 15, 2022

(51) Int. Cl.
*G01C 21/34* (2006.01)
*G05D 1/00* (2024.01)

(52) U.S. Cl.
CPC ..... *G01C 21/3438* (2013.01); *G01C 21/3415* (2013.01); *G05D 1/0088* (2013.01); *G05D 1/0214* (2013.01)

(58) Field of Classification Search
CPC ............ G01C 21/3438; G01C 21/3415; G05D 1/0088; G05D 1/0214; G05D 2201/0216; G05D 1/0212; G05D 1/0297; G06Q 10/083

See application file for complete search history.

(56) References Cited

U.S. PATENT DOCUMENTS

| | | | | |
|---|---|---|---|---|
| 9,720,416 | B1 * | 8/2017 | Rao | G05D 1/0214 |
| 10,562,707 | B1 * | 2/2020 | Wise | G05D 1/0246 |
| 10,894,664 | B1 * | 1/2021 | Brady | B65G 1/1378 |
| 11,222,299 | B1 * | 1/2022 | Baalke | G06Q 10/087 |
| 2013/0211977 | A1 | 8/2013 | Lyon et al. | |
| 2013/0317642 | A1 * | 11/2013 | Asaria | G06Q 10/08 700/216 |

(Continued)

FOREIGN PATENT DOCUMENTS

| CA | 3120407 | 5/2020 |
|---|---|---|
| CA | 3120407 A1 | 5/2020 |

OTHER PUBLICATIONS

European Search Report on EP Appl. Ser. No. 22151378.1 mailed Jun. 17, 2022 (11 pages).

(Continued)

*Primary Examiner* — Anne Marie Antonucci
*Assistant Examiner* — Misa H Nguyen
(74) *Attorney, Agent, or Firm* — Foley & Lardner LLP

(57) ABSTRACT

Disclosed are systems and methods for dynamically routing pickers and autonomous vehicles to avoid areas closed to travel by the autonomous vehicles within a warehouse. A processor in communication with an autonomous vehicle and an electronic device operated by a user (e.g., handheld device) may, in response to detecting that the electronic device diverges from a path of the autonomous vehicle, provide, for display on the electronic device, information about the product. The processor may then determine a rendezvous location for the autonomous vehicle based on a location of the product. The processor may then instruct the autonomous vehicle to navigate to the rendezvous location and transmit the rendezvous location to the electronic device.

18 Claims, 8 Drawing Sheets

(56) References Cited

U.S. PATENT DOCUMENTS

2016/0176638 A1    6/2016  Toebes
2017/0278047 A1    9/2017  Welty et al.
2020/0316786 A1*  10/2020  Galluzzo .................. B25J 9/162
2020/0364652 A1*  11/2020  Rongley ............ G06Q 10/0833
2020/0387154 A1*  12/2020  Sellner ................. G06Q 10/047

OTHER PUBLICATIONS

Examiner's Requisition on Canadian Appl. 3,151,054 dated Nov. 15, 2023 (4 pages).
Office Action on European Patent Office Application 22151378.1 dated Jul. 28, 2023 (4 pages).
Examiners Requisition Office Action on Canada Application No. 3,151,054 dated Oct. 2, 2024 (4 pages).

\* cited by examiner

DYNAMIC ROUTING OF AUTONOMOUS VEHICLES

TECHNICAL FIELD

This application relates generally to autonomous vehicle routing, and more particularly, to dynamically routing an autonomous vehicle that is collecting products.

BACKGROUND

In an effort to increase pick rate and productivity in a warehouse (or in a store), autonomous vehicles may navigate pickers around the warehouse to pick products and place the products in specific containers (totes). Typically, a computer routes autonomous vehicles to locations in the warehouse based on a particular pick route to fulfill various orders using the autonomous vehicle.

BRIEF DESCRIPTION OF THE DRAWINGS

The accompanying drawings constitute a part of this specification and illustrate embodiments of the subject matter disclosed herein.

DETAILED DESCRIPTION

Figure 1A:
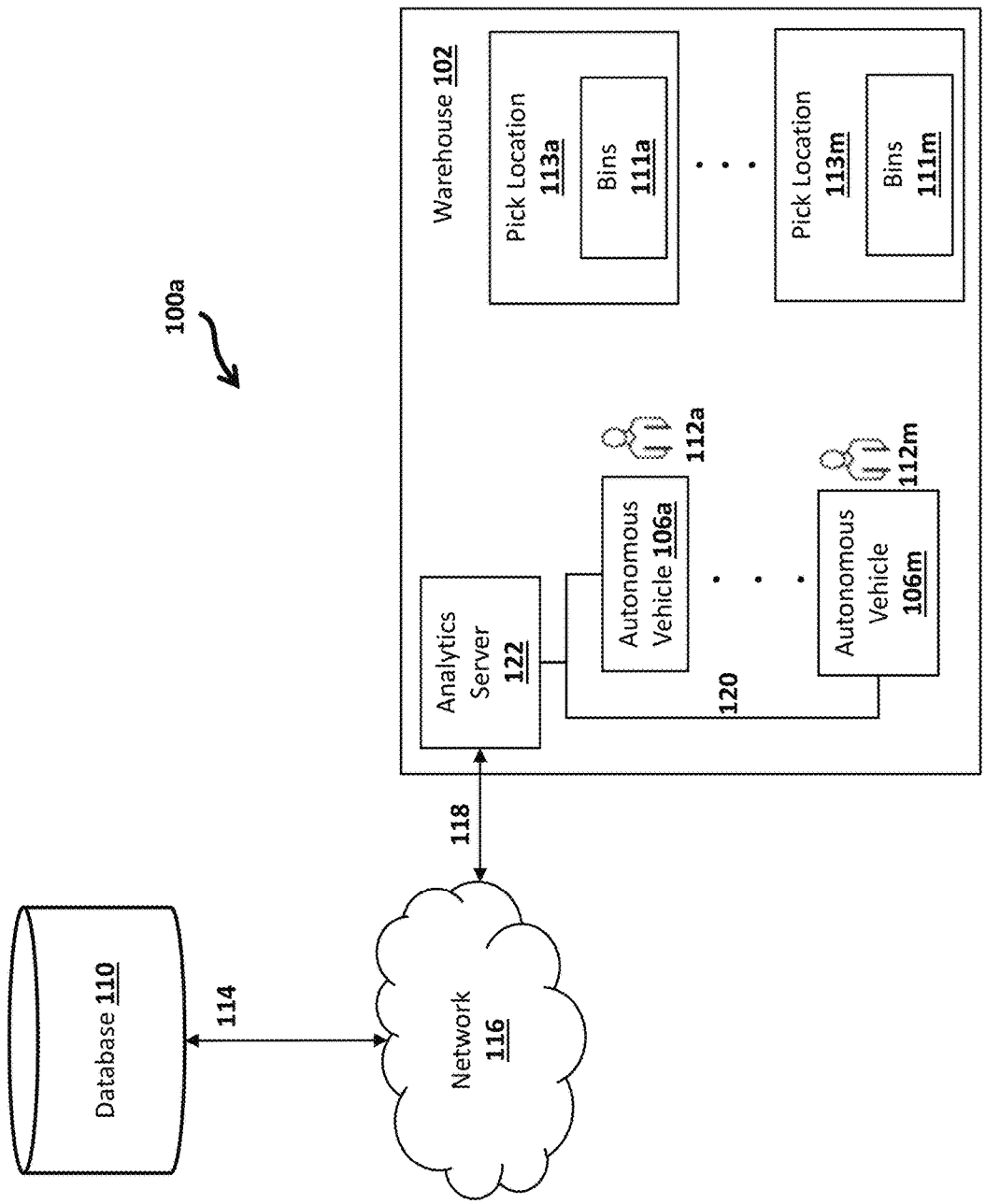
FIG. 1A shows a system for dynamically revising a path for a picker, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Current methods and systems of increasing pick rate and productivity have faced challenges and shortcomings. For instance, warehouses may include locations/areas that are closed to travel by autonomous vehicles, such as loft areas, narrow aisles, aisles with flooring that do not allow for easy maneuvering (e.g., carpeted aisles), crowded areas, and/or separate rooms. As a result, pickers are forced to depart from the pick route and the autonomous vehicle to collect the products. When departing from the autonomous vehicle, pickers must memorize a next pick, collect the products, and return to the autonomous vehicle. This inefficient process relies on each picker's memory and may add time due to the additional walking by the picker back to the autonomous vehicle.

To address the above-described drawbacks, an autonomous vehicle routing system can dynamically revise and reconfigure autonomous vehicle routes (e.g., pick route or pick paths) to guide pickers through areas that are closed to travel by autonomous vehicles (e.g., loft areas, narrow aisles, aisles with flooring that do not allow for easy maneuvering (e.g., carpeted aisles), crowded areas due to other autonomous vehicles or pickers, and/or separate rooms). The disclosed autonomous vehicle routing system may navigate the autonomous vehicle to meet the picker when the picker has collected the product. When the system identifies that a picker has left an assigned autonomous vehicle at an area that is closed to travel by the autonomous vehicle and is operating an electronic device (e.g., the picker has diverged from the autonomous vehicle), the system may present an interface on the electronic device to allow seamless navigation and presentation of data needed for the picker to continue the pick route.

The system may continuously/periodically monitor the location of different autonomous vehicles/pickers and may identify that an autonomous vehicle (operated by a picker) is approaching a product within an area that is closed to travel by the autonomous vehicle (designated or discovered as impassable or indicated as impassable or closed to travel via the electronic device). For instance, the system may use location tracking devices associated with different autonomous vehicles (e.g., GPS, beacon, and/or wireless location tracking) to identify a location of the autonomous vehicle. The system may instruct the autonomous vehicle to display a prompt directing the picker to collect the product (e.g., location, quantity, directions).

Upon reaching the area closed to travel by the autonomous vehicle, the picker may detach the electronic device from the autonomous vehicle to utilize as an interface while picking without the autonomous vehicle. Alternatively, an electronic device (e.g., mobile phone or wrist computer) communicates with an autonomous vehicle but does not attach or physically connect to the autonomous vehicle.

The system may monitor each picker's activity and work progress and may determine when a picker has completed tasks within the area closed to travel by the autonomous vehicle. When the picker has completed the tasks, the system may determine an optimized rendezvous location for the picker to continue operations using the autonomous vehicle. In some cases, it may be more efficient for the picker to meet the autonomous vehicle at a different location than where the picker left it. The system may consider the specific locations of the products to be collected within the area closed to travel by the autonomous vehicle, location of the picker, projected walking time, and projected collection time to determine the optimized rendezvous location and to minimize the picker's walking time to the rendezvous location. Additionally or alternatively, the system may pre-plan a pick route and identify areas closed to travel by the autonomous vehicle and rendezvous locations before the autonomous vehicle reaches the area closed to travel by the autonomous vehicle.

Upon identifying the rendezvous location, the system may transmit an instruction to the autonomous vehicle causing it to navigate to the rendezvous location while the picker is collecting products in the area closed to travel by the autonomous vehicle. The autonomous vehicle may also display an indicator (e.g., picker's name, photo, avatar, "in use" light) to prevent other pickers from accidentally using the autonomous vehicle.

Because a warehouse may include multiple pickers and autonomous vehicles, the system may optimize the routes such that the picker is not necessarily assigned to the same autonomous vehicle each time after passing through an area closed to travel by the autonomous vehicle. The system may optimize routes and rendezvous locations each time a picker leaves an autonomous vehicle and/or when the picker has completed tasks within the area closed to travel by the autonomous vehicle.

The system may transmit an electronic notification to the electronic device displaying a rendezvous location for the autonomous vehicle and, if being assigned to a new autonomous vehicle, an identifier of the new autonomous vehicle. For instance, the electronic device may display real time directions that can navigate the picker to the rendezvous location. In another example, the system may display the directions and/or rendezvous location(s) using digital displays within the warehouse.

The system may display, on the electronic device, an image of the product, location of the product to be collected, a size reference for the product (for comparison), and/or a product identifier. The electronic device may also include an input element (e.g., barcode scanner) for the picker to confirm collection of the product. The electronic device may also utilize augmented reality to indicate a location of the products to be collected or other information about the product itself to assist the picker in confirming the proper product is collected.

The picker may deny collection of a product (e.g., the product is fragile or too heavy) and use the electronic device to send a notification that the product could not be collected. As a result, the system may dynamically re-route another picker and an assigned autonomous vehicle to collect that product. The system will then reconfigure the routing and rendezvous locations for all involved pickers and autonomous vehicles accordingly.

The system may account for erroneous selection of autonomous vehicles. For instance, if a picker starts operating an autonomous robot that is not assigned to the picker, the system may dynamically revise routes associated with other autonomous vehicle and pickers, rendezvous locations, such that the picker can proceed with the originally-assigned tasks or the tasks associated with the selected autonomous vehicle.

The system may continuously monitor autonomous vehicle traffic in real time and use traffic congestion to determine whether an area is closed to travel by the autonomous vehicle. For instance, an area may not be designated as an area that is closed to travel by the autonomous vehicle within the building layout. However, because two autonomous vehicles have been assigned to the same aisle, the aisle is now not big enough for a third autonomous vehicle (i.e., at this particular time, the aisle is closed to travel by the third autonomous vehicle). The system can dynamically instruct the picker to leave the autonomous vehicle and collect one or more products or can re-order the pick list so the autonomous vehicle can return to the area at a later time.

I. Components and Operations of Illustrative Systems

FIG. 1A illustrates a system 100a for dynamically revising a path for a picker, according to an embodiment. The system 100a includes a database 110 connected to a communications network 116. The communications network 116 connects to an analytics server 122 associated with a warehouse 102. The warehouse 102 may contain autonomous vehicles 106a to 106m (collectively referred to as autonomous vehicle(s) 106), pickers 112a to 112m (collectively referred to as pickers 112), pick locations 113a to 113m (collectively referred to as pick locations 113), and shelves/racks/bins 111a to 111m (collectively referred to as bin(s) 111). Embodiments may include or otherwise implement any number of devices capable of performing the various features and tasks described herein. For example, FIG. 1A shows the analytics server 122 as a distinct computing device in the warehouse 102. In some embodiments, the analytics server 122 may be located in a different warehouse or capable of communicating with analytics servers 122 in various warehouses. Embodiments may comprise additional or alternative components, or may omit certain components, and still fall within the scope of this disclosure.

The databases 110 are coupled via communications links 114, to communications network 116, and via communications link 118 to the analytics server 122 associated with the warehouse 102. The communications network 116 may be a public or private network, and the communications links 114, and 118 that connect to communications network 116 may be wired or wireless. Non-limiting examples of the communications network may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The databases 110 store and manage data records of various products. For example, databases 110 may store product quantities, product locations, product shipping schedules, product manufacturer information, and the like. The products in the warehouse 102 may be held, sold, maintained, stored, or otherwise transferred through the warehouse 102. The warehouse 102 may include a product storage facility or shipping depot, for example, for transitioning foods or products from one facility to a next or to a customer location (e.g., house, office).

The database 110 may also store data records indicating a quantity of a product and a location of a product in the warehouse 102 (e.g., in a bin 111 at a particular pick location 113). Some pick locations 113 contain bins 111 of one particular product. Some pick locations 113 contain bins 111 of multiple products. The database 110 may contain data records of the same product being stored in bins 111 in multiple pick locations 113.

The analytics server 122 is associated with warehouse 102 and may be physically located at the warehouse 102 or located remotely from warehouse 102. In the schematic embodiment shown in FIG. 1A, the analytics server 122 is shown as being located in the warehouse 102, which may represent a physical and/or remote location of the analytics server 122 or its functionality, though the analytics server 122 may be located in a remote location. The analytics server 122 may be implemented as a distributed system or as a single device. In the case of a distributed system, one or more processors located outside the warehouse or in other devices may be, and sometimes are, used to perform one or more steps attributed to the analytics server 122 in this embodiment.

The analytics server 122 may communicate with databases 110, autonomous vehicles 106, and devices associated with pickers 112 (e.g., mobile phones, personal data assistants (PDA), tablet computers, handheld scanners, or wearable devices such as watches, artificial reality glasses, and earpieces). For example, the analytics server 122 may communicate with one or more transceivers to transmit and receive information. The transceiver may transmit instructions to electronic devices, such as mobile or wearable devices of pickers 122 or autonomous vehicles 106, and/or receive product information, deadline information, carrier information and the like from databases 110. The autonomous vehicle 106 may communicate with the analytics server 122, databases 110, and/or devices associated with pickers 112.

The analytics server 122 may receive product status information (e.g., whether a product at a pick location 113 has shorted), and completion of task information (e.g., product picks) associated with the pick path (also referred to herein as pick route) from the autonomous vehicle 106. The analytics server 122 may update data records in databases 110 in real time (or near real time) as products are being stocked and picked from pick locations 113 (including bins 111) in warehouse 102. Additionally or alternatively, the analytics server 122 may update data records in database 110 periodically (e.g., daily, monthly, and quarterly). In some configurations, data records in database 110 are updated in response to trigger conditions (e.g., a shipment of a particular product arrives at the warehouse 102, a product is identified by a picker 112 as being out of stock).

The analytics server 122 may receive order information, directly or indirectly from customers, in real time (or near real time). The analytics server 122 may generate instructions for pickers 112 and associated autonomous vehicles 106 to retrieve one or more products in bins 111 from one or more pick locations 113 to complete an order or request from a customer (e.g., online order, pick list, customer's list, grocery list, shopping list). In some configurations, autonomous vehicles 106 are loaded with a number of containers based on the products to be picked in the warehouse 102 with one or more orders. Particular containers on the autonomous vehicle 106 may be assigned products from one or more orders such that when a picker 112 picks the product, the picker 112 is instructed to place the product into the particular container assigned to the product.

The analytics server 122 may cause instructions to display on the autonomous vehicle 106. The autonomous vehicle 106 may receive instructions from the analytics server 122, routing the autonomous vehicle 106 and picker 112 through the warehouse 102 to bins 111 at pick locations 113. In some configurations, the autonomous vehicle 106 may communicate with the database 110 to provide offline access to inventory data and/or product data.

The autonomous vehicle may display the path to the picker 112 assigned to the autonomous vehicle 106. The analytics server 122 may also cause instructions to display on a digital display within the warehouse 102. Additionally or alternatively, pickers 112 may utilize an electronic device (e.g., mobile phone, tablet computer, or a wearable device such as an earpiece, glasses, watch, wrist computer) configured to receive instructions and/or notifications from the analytics server 122. In one configuration, the electronic device may be attached to the autonomous vehicle 106 and detached as needed. In other embodiments, the autonomous vehicles 106 receive instructions and/or notifications from the analytics server 122 and transmit the instructions and/or notification to the pickers 112.

The instructions routing the autonomous vehicle 106 may indicate an order (e.g., a sequence) to provide or display the tasks for the path such that the tasks for individual products are provided or displayed one at a time, for example, in sequential order through an interface on the autonomous vehicle 106. The instructions may interleave picking products of various orders (e.g., lists of products for particular customers) such that the picker's time picking products in warehouse 102 is minimized. The autonomous vehicle 106 may display, using the instructions, one individual task at a time as a picker 112 progresses through the path such that upon completion of a first task (e.g., picking a first product at a first bin 111a at a first pick location 113a), the autonomous vehicle 106 displays a second task (e.g., picking a second product at a second bin 111b at the first pick location 113a, or picking a second product at a second bin 11b at a second pick location 113b).

The analytics server 122 may continuously (or periodically) monitor the location of different autonomous vehicles 106 and pickers 112 in the warehouse 102. In some configurations, the analytics server 122 may track (or monitor) the location of pickers 112 or autonomous vehicles 106 using location-aware sensors. For example, the analytics server 122 may track the autonomous vehicle 106 or wearable devices (e.g., electronic devices such as earpieces, glasses, watches, wrist computers) worn by the picker 112. The analytics server 122 may also use global positioning systems (GPS), beacon signal data, or other forms of signal data to identify a picker 112 and/or autonomous vehicle 106 at a particular location within the warehouse 102.

Additionally or alternatively, the analytics server 122 may determine a projected location of the autonomous vehicle 106 and/or picker 112. For example, the analytics server 122 may instruct the picker 112 to pick products in a sequence (e.g., the path) at various bins 111 from one or more pick locations 113 to complete an order (or multiple interleaved orders). Accordingly, the analytics server 122 may determine a projected location of the autonomous vehicle 106 and associated picker 112 based on GPS information indicating the current location of the autonomous vehicle 106, information related to the next product to be picked according to the path, and a speed of a particular picker 112, an average speed of pickers 112, or a speed of an autonomous vehicle 106. The analytics server 122 may determine, for instance, the projected location of the autonomous vehicle 106 and/or picker 112 in the next four minutes.

The analytics server 122 may also approximately track the autonomous vehicle 106 based on receiving updates from the picker 112 and/or autonomous vehicle 106. The analytics server 122 may monitor (or track) a picker's 112 activity and work progress to determine the projected location. For example, the analytics server 122 may receive notifications every time the picker 112 collects a product for an order. The analytics server 122 may determine the projected location of the picker 112 and/or autonomous vehicle 106 based on the work progress of the picker, and information about the products being picked (e.g., the pick location 113 of the last product picked by the picker 112).

Additionally or alternatively, the analytics server 122 may receive a notification when the picker 112 identifies a delay in picking products for the order. For example, the picker may identify a delay if a product is unavailable at a bin 111 and/or the product is damaged. The delay may indicate a deviation from the path and/or the timing associated with completing the path (or the order). The analytics server 122 may consider the delay and/or the work progress in determining the projected location.

The analytics server 122 may distinguish pickers 112 from other pickers 112 and/or from autonomous vehicles 106 by associating identifiers with each picker 112 and/or each autonomous vehicle 106. As a result, the analytics server 122 may receive and differentiate information from particular pickers 112 (or autonomous vehicles 106). For example, the analytics server 122 may determine a current location of a particular picker 112 (or autonomous vehicle 106) based on beacon signal data. Identifiers with each picker 112 may include, for example, numerical identifiers, colors, logos, and names.

When the picker 112 completes picking products associated with an order or request from the customer, the analytics server 122 may determine that the picker 112 should meet a subsequent autonomous vehicle 106 to perform tasks associated with a new pick list or a remaining portion of a pick list associated with the subsequent autonomous vehicle 106 such that the picker's 112 time spent walking to a take-off station (e.g., a station where autonomous vehicles 106 are docked, loaded with containers, and initially assigned pickers 112) is minimized.

The analytics server 122 may route the picker 112 to a subsequent autonomous vehicle 106 and/or a particular meeting location (or rendezvous location). The analytics server 122 may compare a work progress of various autonomous vehicles 106, locations of autonomous vehicle 106 with respect to the position of the picker 112 (e.g., determined via GPS and/or schedule of pickers 112 and autonomous vehicles 106), and priority of orders to be picked associated with various autonomous vehicles 106. When the analytics server 122 identifies a subsequent autonomous vehicle 106 to route the picker 112 to, the analytics server 122 may display the picker's identifier (e.g., defined individual color, defined shift and/or group color, defined logo, picker identifier, and the like) on the identified subsequent autonomous vehicle 106 (e.g., via electronic device 211 in FIG. 2C).

For example, a picker 112 finishing a pick list associated with a particular autonomous vehicle 106 may be instructed to meet a second picker 112 and a second autonomous vehicle 106 such that the second picker 112 may handoff the second autonomous vehicle 106 to the first picker 112. In some configurations, the autonomous vehicle 106 may automatically navigate to the defined location.

A picker 112 may handoff the second autonomous vehicles 106 if the picker's 112 shift is ending or if the picker 112 is scheduled to go on a break. Additionally or alternatively, the analytics server 122 may compare a list of products to be collected by each picker 112 (and/or a work progress) to identify whether the analytics server 122 should provide instructions to route the picker 112 to the subsequent autonomous vehicle 106 and/or a particular location.

The analytics server 122 may instruct the picker 112 to travel to a particular location. The instructions may include a picker rendezvous location, a meeting (or rendezvous) time, a departure time (e.g., a departure time from a current location in the warehouse 102), directional instructions, an identification of a subsequent autonomous vehicle 106 with subsequent pick lists to be picked by the picker 112, and an identification of a different picker 112 to meet the picker 112 at the rendezvous location.

Additionally or alternatively, at a time before the picker 112 completes picking products associated with an order (e.g., when the picker has picked a penultimate product for the order), the analytics server 122 may route the picker 112 to a subsequent autonomous vehicle 106 and/or a particular location in the warehouse.

The analytics server 122 may route the picker 112 to a subsequent autonomous vehicle 106 and/or a particular location in the warehouse based on the picker's 112 work progress or current (or projected) location in the warehouse 102. For example, the analytics server 122 may determine that an order is languishing on an autonomous vehicle 106 associated with a particular picker. That is, the analytics server 122 may determine that the picker 112 is not maintaining a certain pick rate based on the picker's 112 work progress. The pick rate may be an indication of the time that a picker 112 is spending in a warehouse 102. A high pick rate may indicate that the picker 112 is optimizing their time in the warehouse 102 by minimizing the time spent navigating to particular bin locations 113 in the warehouse 102 and/or other autonomous vehicles 106. Accordingly, before the off-track picker 112 continues picking products associated with the order, the analytics server 122 may route a different picker 112 to the autonomous vehicle 106 in an attempt to maximize both pickers' 112 pick rates. Additionally or alternatively, the analytics server 122 may handoff the container associated with the order to a different autonomous vehicle 106.

The analytics server 122 may also reassign a picker 112 to a rendezvous location and/or a subsequent autonomous vehicle 106 even if the picker 112 has not completed picking the products associated with the order. For example, if a first autonomous vehicle 106 is instructed to go to a pick location 113 at an opposite end of warehouse 102 for additional picks, the analytics server 122 may reassign picker 112 associated with the first autonomous vehicle 106 to a second autonomous vehicle 106 that is nearby such that the picker 112 can continue picking with the second autonomous vehicle 106 instead or traveling with the first autonomous vehicle 106 to the pick location 113 at the opposite end of the warehouse 102.

Additionally or alternatively, the analytics server 122 may assign the picker 112 to another autonomous vehicle 106 that is located at a take-off station (e.g., a new autonomous vehicle 106 that has not been assigned a picker 112). The analytics server 122 balances the route navigating the picker 112 and corresponding autonomous vehicle 106, such that picker 112 is not always assigned to autonomous vehicles 106 having a new pick list, thereby increasing overall efficiency. For example, the analytics server 122 may determine whether the picker 112 is assigned to an autonomous vehicle 106 already in use (e.g., not docked at the take-off station) or assign another autonomous vehicle 106 with a new pick list to the picker 112 based on the pick lists of active (e.g., not docked autonomous vehicles 106), projected locations, travel times, deviated distances, and the like.

In the event the picker 112 starts picking products for an autonomous vehicle 106 that was not assigned to the picker 112 (e.g., the picker 112 selects a autonomous vehicle 106 at a take-off station not assigned to the picker 112), the analytics server 122 may dynamically revise routes associated with other autonomous vehicles 106 and pickers 112, rendezvous locations, rendezvous times, departure times, and the like, such that the picker 112 can continue picking products associated with the autonomous vehicle 106 even though the picker 112 selected a different autonomous vehicle 106 from the autonomous vehicle that the analytics server 122 identified.

In some configurations, depending on the capacity (or the expected capacity and/or fill volume) of containers of each of the autonomous vehicle 106, the analytics server 122 may not revise the routes associated with other autonomous vehicles 106 but instead update the pick list associated with orders on the other autonomous vehicles 106 (and the autonomous vehicle 106 the picker 112 selected in error). The analytics server 122 may update the pick list (or pickers 112 assigned to autonomous vehicles 106) of each of the autonomous vehicles 106 to optimize a particular picker's 112 pick rate and/or maximize a number of pickers' 112 pick rate. For example, the analytics server 122 may update the pick list such that a picker 112 picks products of various orders stored at the same pick location 113 in the warehouse.

Figure 1B:
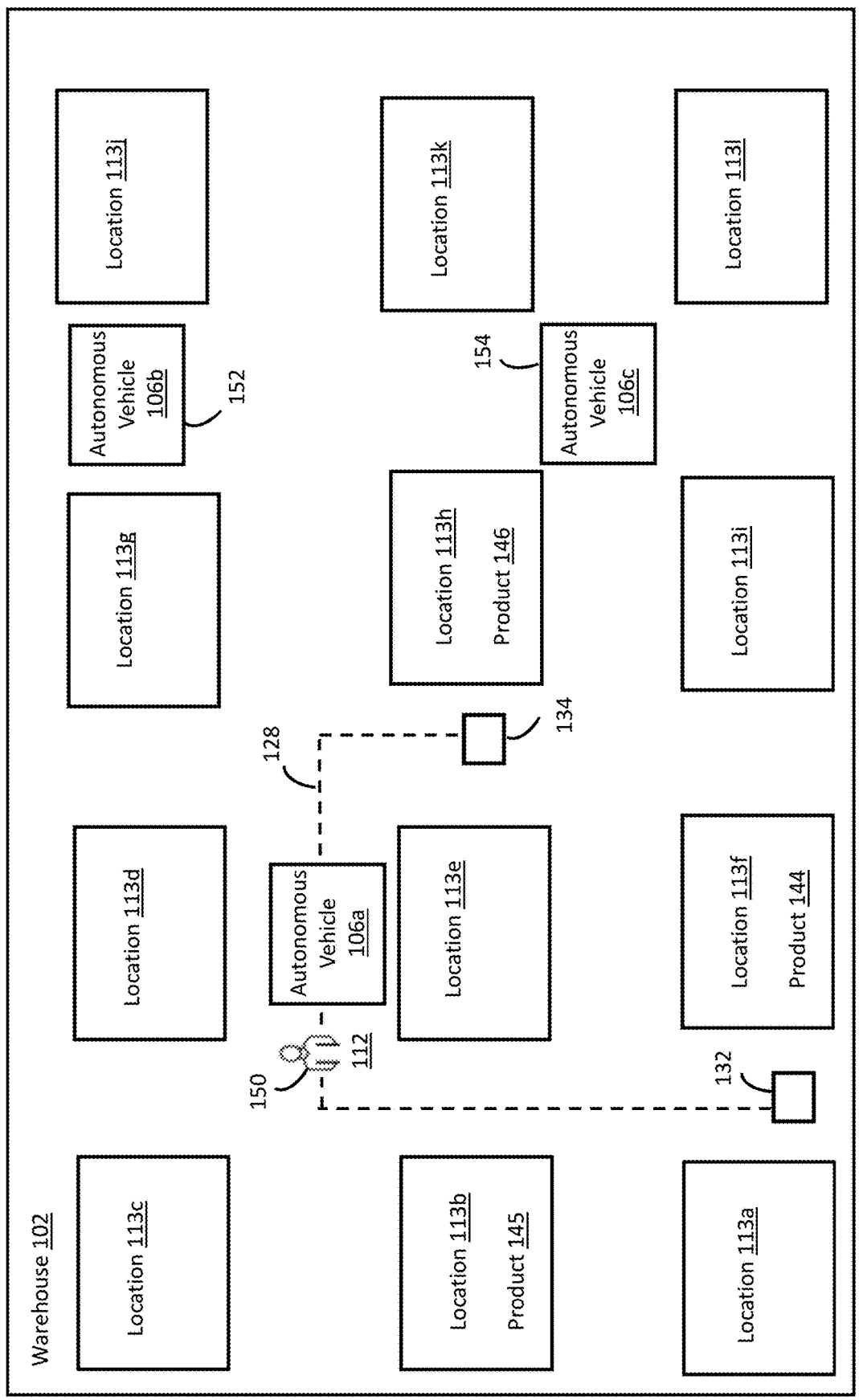
FIG. 1B illustrates a diagram of paths through a warehouse with various pick locations, according to an embodiment.

FIG. 1B illustrates a diagram of a path 128 through a warehouse 102 with various pick locations 113. The path 128 can include or correspond to an original or initial path generated based on the locations 113 (e.g., pick locations 113a-113m) of products in warehouse 102. The path 128 can provide a route through the warehouse 102 for an autonomous vehicle 106 and picker 112 to follow to select or retrieve products 144-146 associated with one or more orders. The path 128 corresponds to a minimal or smallest total distance for the autonomous vehicle 106 to travel through the warehouse 102 to select and/or retrieve the products for one or more orders from the different pick locations 113 within the warehouse 102.

The autonomous vehicle 106 can execute the instructions to collect the products in a determined order. The determined order of products to be picked is a sequential order based in part on a position on the path 128, a current location 150 in the warehouse 102, and/or a location of a product at a pick location 113.

For example, the autonomous vehicle 106 can execute instructions for a first location 113f for a first product 144 and wait to execute instructions for a second location 113b for a second product 145 until the autonomous vehicle 106 receives an indication that the first product 144 has been picked. Additionally or alternatively, the autonomous vehicle 106 may receive an indication that the first product 144 is unavailable and/or damaged.

The path 128 can include a take-off point 132 and an end point 134 with each of the pick locations 113 at different points along the path 128. It should be appreciated that the path 128 can include a single location 113a or multiple locations 113 (e.g., pick locations 113a-113m) with the number of pick locations 113 on path 128 determined based in part on a number of products 144-146 picked for one or more orders.

The autonomous vehicle 106 can execute the instructions and traverse the path 128 selecting and retrieving the corresponding products 144-146 from the respective locations 113. For example, the picker 112a may pick product 144 from location 113f, pick product 145 from location 113b, and pick product 146 at location 113h.

Upon completing the pick tasks associated with the autonomous vehicle 106a (e.g., picking products 144-146), the picker 112 may navigated to a rendezvous point be reunited with the autonomous vehicle 106a or to be assigned to a new autonomous vehicle. Alternatively, the analytics server 122 may transmit instructions navigating the picker 112 to a second autonomous vehicle (e.g., autonomous vehicle 106b or 106c depending on the routing criteria).

In some configurations, the analytics server 106 may navigate the picker 112 to the autonomous vehicle 106c because the autonomous vehicle 106c is closer than the autonomous vehicle 106b. In other configurations, the analytics server 122 may navigate the picker 112 to the autonomous vehicle 106b in response to a projected location of the autonomous vehicle autonomous vehicle 106b. For example, autonomous vehicle 106c may be traveling away from the picker 112 while autonomous vehicle 106b may be traveling toward the picker 112. Accordingly, a projected location of a product to be picked with autonomous vehicle 106b may be closer (e.g., take less time for the picker to walk to) than a projected location of a product to be picked with autonomous vehicle 106c.

The analytics server 122 can transmit instructions for the picker's path to the new autonomous vehicle (e.g., autonomous vehicle 106b or 106c depending on the routing criteria). In some embodiments, the autonomous vehicle 106 can dynamically update, using the instructions, the display of the picker's path. Alternatively, the electronic device (attached or detached from the autonomous vehicle or a wearable device) can dynamically update, using the instructions, the display of the picker's path.

II. Autonomous Vehicles

A worker (e.g., picker) may pick products from bins or shelves at particular locations in a warehouse or other storage facility and load the picked products on an autonomous vehicle. The autonomous vehicle may navigate to one or more rendezvous locations, and when necessary, the autonomous vehicle may navigate to one or more packing (also called pick routes) stations such that the products on the autonomous vehicle may be unloaded and packed for shipping. In some configurations, when picking using a detachable/handheld device, the picker may also navigate to the packing station.

The autonomous vehicle may also navigate (e.g., be instructed by a server to navigate) to one or more healing stations such that containers containing orders with shorted products may be removed from the autonomous vehicle and the containers (and associated orders) may be integrated into pick routes of other autonomous vehicles. In some configurations, the picker may also accompany the autonomous vehicle to the healing station. The healing station may take alternative action to otherwise cure a shorted order.

The system can be configured for robotics to replace or assist the pickers. In some implementations, a robotic autonomous vehicle may move autonomously throughout the warehouse or storage facility. When moving autonomously, the autonomous vehicle can move alongside a picker or independently of a picker to locations in the warehouse. In other implementations, the robotic autonomous vehicle can pick products from bins or shelves and load the picked products onto the autonomous vehicle. The robotic autonomous vehicle may also place products from the autonomous vehicle onto bins or shelves.

As shown in FIG. 1A, autonomous vehicles 106 are located in the warehouse 102 and controlled by the analytics server 122 via communications link 120. Pickers 112 may work alongside the autonomous vehicles 106 to perform operations (e.g., pick products from bins 111 in the warehouse 102 and place those products in the autonomous vehicle 106, replenish bins 111 in the warehouse by stocking products on the bins using the products in an autonomous vehicle 106, and remove products from the autonomous vehicle 106 such that the products may be unloaded and packaged for shipping). In the example used herein, the autonomous vehicle is robotic and has autonomous operation based on instructions communicated from the analytics server 122. In some embodiments, the autonomous vehicle 106 may be manually operated by a picker 112, who may push, pull, drive, or otherwise move the autonomous vehicle 106 around the warehouse 102. For example, the autonomous vehicle 106 may have a shopping cart configuration. A manually operated autonomous vehicle 106 may still use other components for communicating with the analytics server 122 and the picker 112, such as a screen for communicating information to the picker 112 from the analytics server 122.

Figure 2A:
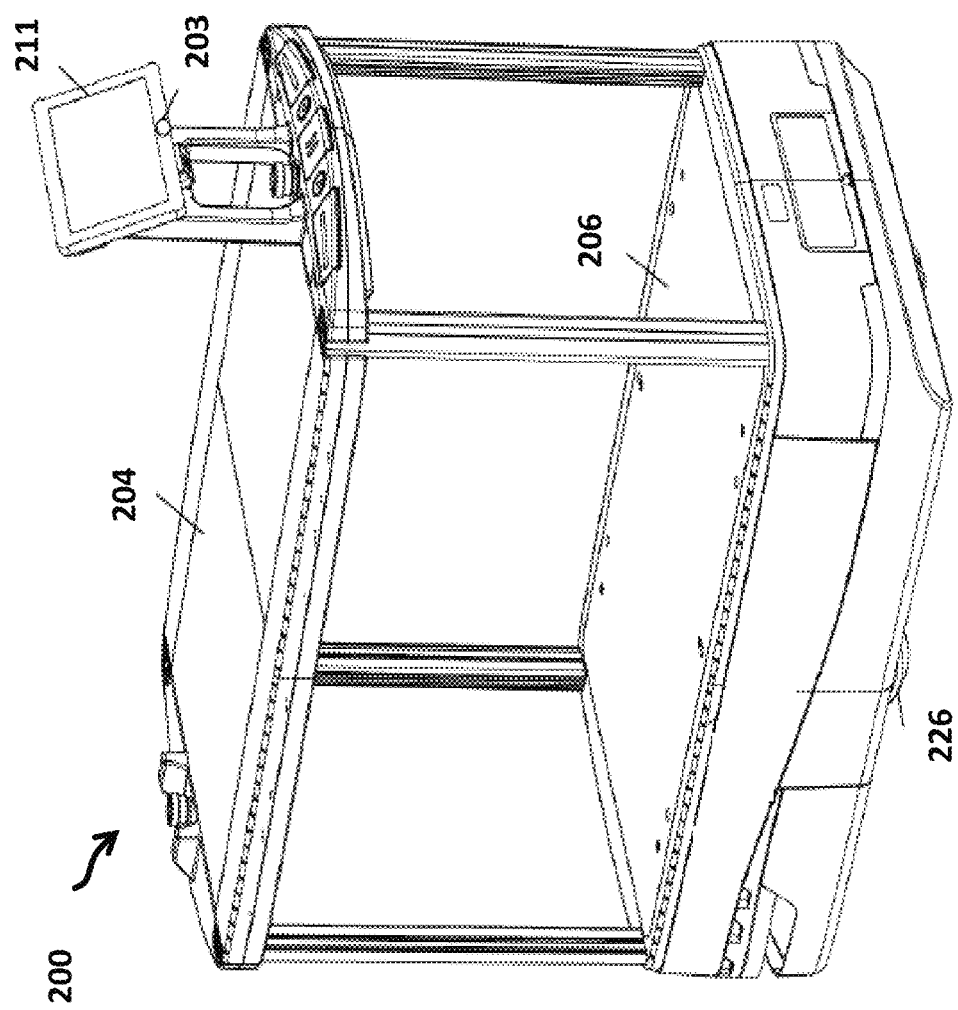
FIG. 2A shows an autonomous vehicle, according to an embodiment.

FIG. 2A shows an autonomous vehicle 200, according to an embodiment. The autonomous vehicle 200 has wheels 226, electronic device 211, speaker 203, and two shelves 204, 206. In some instances, weighing scales (not shown) may be incorporated into the shelves 204, 206. For instance, the shelves may include pressure plates. The autonomous vehicle 200, through notifications displayed on electronic device 211 and/or audio instructions provided via speaker 203 (which may be a component of the electronic device 211), may notify a worker of the total weight of products on the shelves 204, 206 (e.g., the weight of the products on each shelf 204 and 206 respectively, the weight of combined shelves 204, 206). One or more containers (as described in FIG. 2C) can be, and sometimes are, transported on each of the shelves 204, 206 of the autonomous vehicle 200. The scales may have a tare feature such that the weight of containers on the scales can be zeroed. Eliminating the weight of the container on the scale allows the analytics server to determine the weight of the products in the container.

While a two-shelf autonomous vehicle embodiment is shown, multiple autonomous vehicle configurations are possible, with some autonomous vehicles being implemented using a single shelf while other autonomous vehicles have two or more shelves. Each of the containers on the autonomous vehicle may have several levels (layers, zones) for storing and transporting the picked products.

The autonomous vehicle 200 may be configured to determine product dimensions. For instance, a weighing autonomous vehicle may utilize shelves 204, 206 with scales to weigh the products. Additionally or alternatively, a measuring autonomous vehicle may carry one or more measuring devices (e.g., augmented reality measurement tools, rulers, measuring tape) and/or be configured with an imaging system such that the processor (230 in FIG. 2C) on the autonomous vehicle may determine the size of the product (e.g., depth, width, height). For example, the processor may perform object recognition to measure the product such that the imaging processing may recognize a product and even distinguish it from a hand of a picker. In some instances, the processor may support object recognition capabilities and/or be capable of executing the imaging system. The processor may determine the dimensions of the product and communicate the product dimensions to the analytics server (122 in FIG. 1). Additionally or alternatively, the analytics server may receive image data (raw data, compressed data) from the imaging system and perform object recognition to determine the dimensions of the products placed on the autonomous vehicle 200. The autonomous vehicle 200 may be configured for both weighing products and measuring the sizes of products.

The autonomous vehicle 200, through visual instructions displayed on electronic device 211 and/or audio instructions provided via speaker 203, may transmit an instruction to place one or more products on an inspection station. For example, a picker assigned to an autonomous vehicle 200 may receive instructions from the autonomous vehicle 200 to pick a product to be inspected on route to a location (e.g., such as an inspection station, a subsequent product location, etc.) Additionally or alternatively, an administrator (using a management console, for instance), may trigger an inspection. That is, a management console or other administrative device may transmit an instruction (via electronic device 211, speaker 203, and/or wearable devices worn by the picker) to place one or more products on an inspection station, place one or more products on an autonomous vehicle 200 on route to a location, and the like.

In FIG. 2A, the electronic device 211 is shown attached to the autonomous vehicle 200. In some configuration, the autonomous vehicle 200 may include multiple electronic devices. For instance, the autonomous vehicle may include the electronic device 211 that is connected and another electronic device (not shown) that is detachable. Therefore, the autonomous vehicle 200 may be in communication with multiple electronic devices, some of which may be detachable.

The electronic device 211 may be removable from the autonomous vehicle 200 and reattached. When detached, the electronic device 211 may operate as a handheld device, such as a mobile phone or tablet computer. The autonomous vehicle may utilize a docking station (or cradle) to support the electronic device 211. The docking station may couple to a port of the electronic device 211 to provide power and/or communications. When the electronic device 211 is detached from the autonomous vehicle 200, the electronic device 211 may utilize battery power and wireless communication with the autonomous vehicle 200 and/or server. Responsive to the electronic device 211 being removed from the autonomous vehicle 200 (e.g., undocking and/or unplugging), a status of the electronic device 211 changes to a "detached" status. The autonomous vehicle 200 may also change a status for "detached" when there is no electronic device attached. The server may receive a notification from the autonomous vehicle 200 or the electronic device that the electronic device 211 was detached.

Figure 2B:
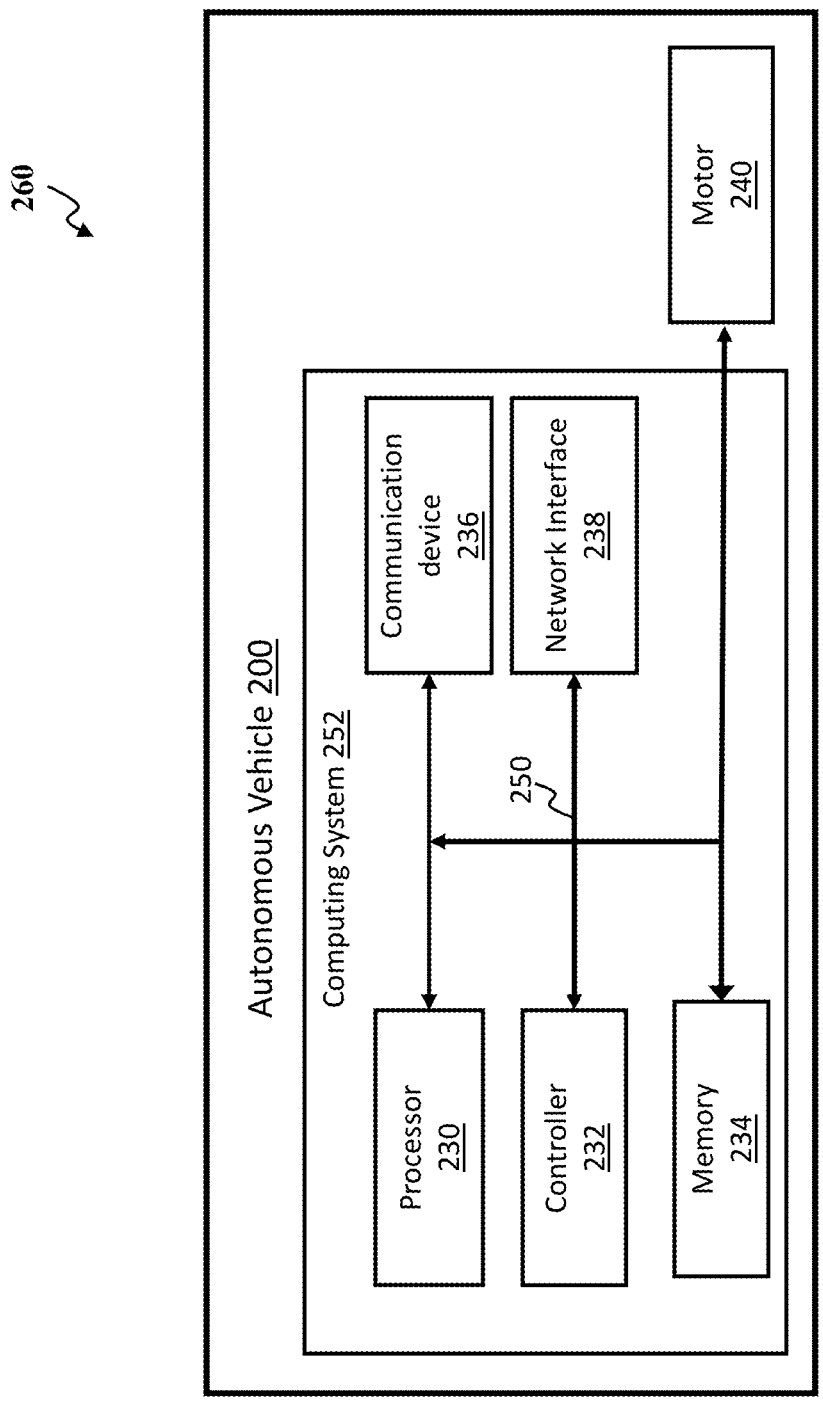
FIG. 2B shows a block diagram of an autonomous vehicle system that may be used in implementing the systems and methods described herein, according to an embodiment.
Figure 2C:
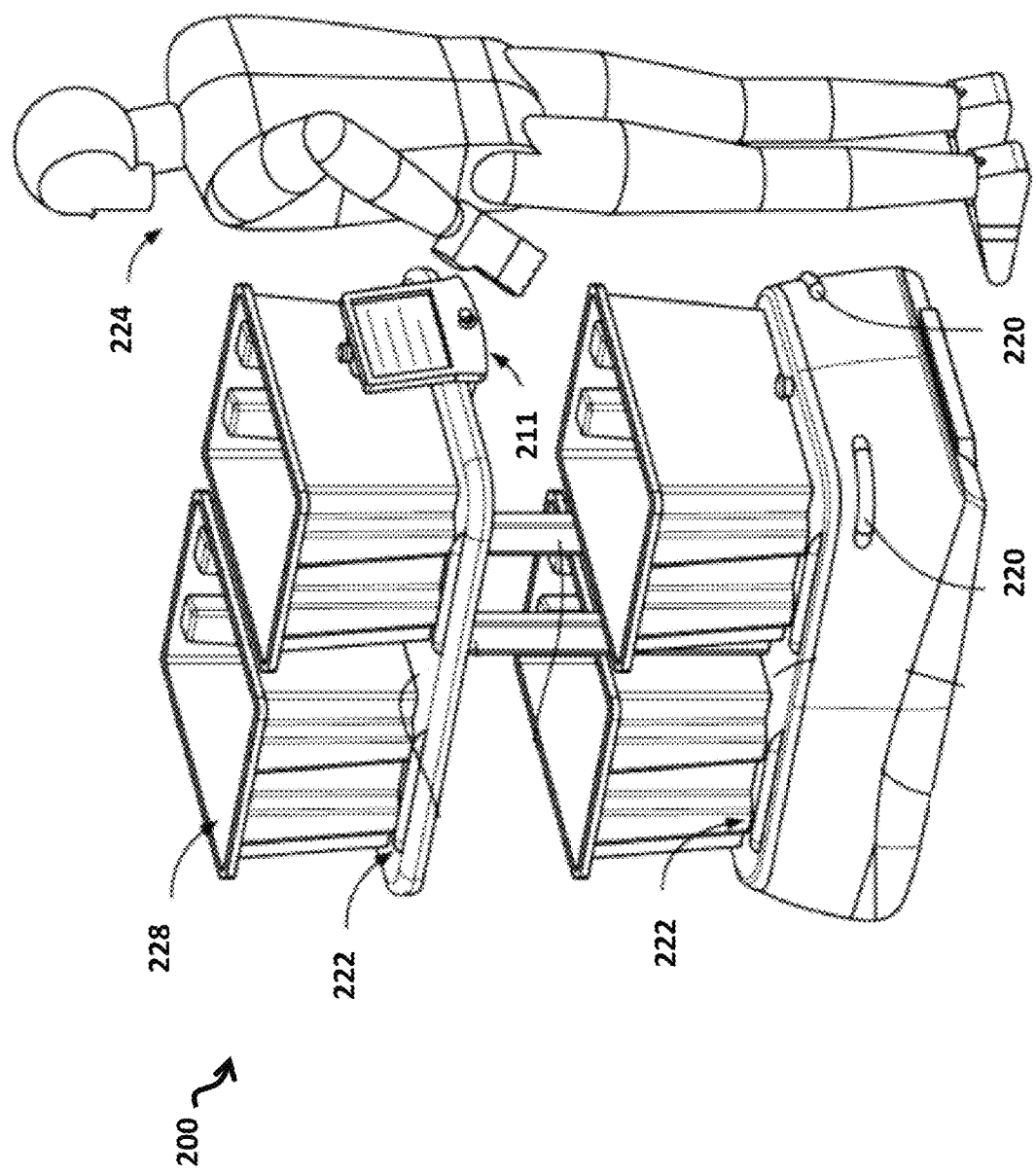
FIG. 2C shows an autonomous vehicle configured with multiple containers, according to an embodiment.
Figure 2D:
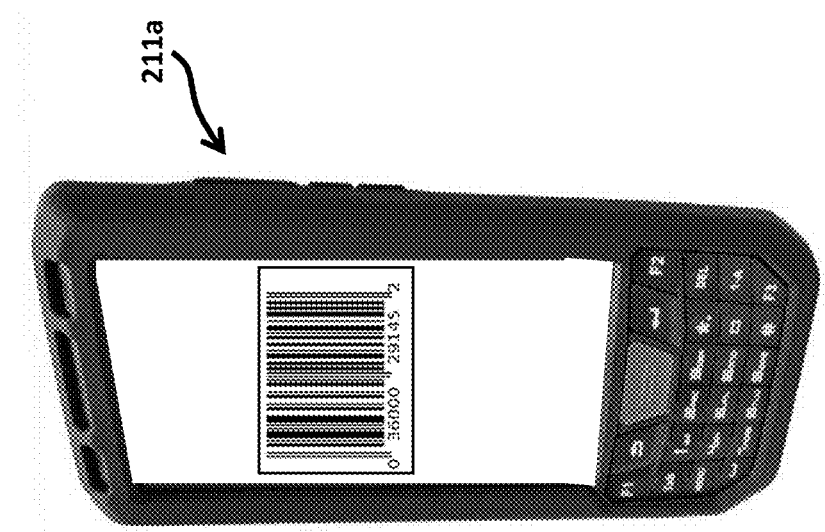
FIG. 2D shows an electronic device in communication with an autonomous vehicle, according to an embodiment.

Referring now to FIG. 2D, an electronic device 211a is shown, in accordance to an embodiment. The electronic device 211a may be any computing device comprising a processor, a non-transitory machine-readable storage medium capable of performing the various tasks and processes described herein, and a display configured to output various prompts and notifications discussed herein. The processor of the electronic device 211a may be in communication with a processor of one or more autonomous vehicles, such as the autonomous vehicle 200 using a wired or wireless communication protocol. For instance, the electronic device 211a may be physically connected to the autonomous vehicle 200 or may only wirelessly communicate with a processor of the autonomous vehicle 200. The processor of the electronic device 211a may also be in communication with the analytics server. The processor of the electronic device may be configured to perform various steps of the methods discussed herein, such as any part of the method 300 described in FIG. 3.

The electronic device 211a may be equipped with a location-tracking module where the location-tracking module is configured to transmit location information associated with the electronic device 211a to one or more autonomous vehicles and/or the analytics server. The electronic device 211a may also be equipped with a camera configured to capture images under the direction of a picker. For instance, the camera may be a barcode scanner that is configured to scan a barcode for a product.

In operation, a picker may communicate with the analytics server and/or an autonomous vehicle using an application executing on the electronic device 211a (e.g., a mobile device). The electronic device 211a may display instructions for the picker to leave the autonomous vehicle and collect a product. The electronic device 211*a* may also display an image and/or a location of the product for the picker. After collecting the product (or sometimes after depositing the product onto a bin of the autonomous vehicle), the picker may use the barcode scanner of the electronics device 211*a* to confirm its collection.

Referring back to FIG. 2A, the autonomous vehicle 200 may also act as the inspection station. Inspection stations may also include designated areas of the warehouse in which a product is weighed and/or measured. Additionally or alternatively, the autonomous vehicle 200, through visual instructions displayed on electronic device 211 and/or audio instructions provided via speaker 203, may transmit an instruction to measure one or more products using equipment in the warehouse (e.g., measuring tape, rulers, or scales).

FIG. 2B shows a block diagram of an autonomous vehicle routing system 260 that may be used in implementing the systems and methods described herein, according to an embodiment. The computing system 252 of an autonomous vehicle 200 may include a processor 230, a controller 232, a memory 234, a communication device 236, and a network interface 238. The autonomous vehicle 200 may also include a motor 240. Each of the components 230, 232, 234, 236, 238, and 240 may be interconnected, for example, using a system bus 250. General-purpose computers, network appliances, mobile devices, or other electronic systems may also include at least portions of the computing system 252.

The computing system 252 may receive and/or obtain information about a customer order (e.g., from the analytics server), including a list of products, the dimensions of the products, the weight of the products, characteristics of the products (a fragility score, a hazard score), the priority of the order relative to other orders, the target shipping date, the carrier pick up time, whether the order can be shipped incomplete (without all of the ordered items) and/or in multiple shipments, etc.

The controller 232 may be configured to send control signals to the motor 240 and/or other components of the autonomous vehicle 200 as described further herein. The motor 240 may be configured to convert electrical energy received from an electrical power source (e.g., battery, super capacitor, etc.) into rotations of the wheels (226 in FIG. 2B). The motor 240 propels the autonomous vehicle 200 such that the autonomous vehicle 200 moves autonomously and does not require being pushed or pulled by a human or other force.

The memory 234 stores information within the computing system 252. In some implementations, the memory 234 is a non-transitory computer-readable medium. In some implementations, the memory 234 is a volatile memory unit. In some implementations, the memory 234 is a non-volatile memory unit.

The memory 234 may store warehouse operation information. The warehouse operation information may include documented product dimensions, container capacity (e.g., weight limit, product count limit), shelf capacity (e.g., weight limit, product count limit), and bin capacity (e.g., weight limit, product count limit). The memory 234 may also store product information such as a product name, a product description, a product image, and product storage location.

The processor 230 is capable of processing instructions for execution within the computing system 252. In some implementations, the processor 230 is a single-threaded processor. In some implementations, the processor 230 is a multi-threaded processor. The processor 230 is capable of processing instructions stored in the memory 234.

The processor 230 in the autonomous vehicle 200 (and/or the analytics server 122 in FIG. 1A) controls the autonomous vehicle's 200 movement to/from one location (e.g., pick location) to the next location (e.g., unloading station, subsequent pick location). The processor 230 may be in communication with controller 232 and/or motor 240. In the event the autonomous vehicle 200 becomes associated with a different worker (e.g., a worker at an unloading station or a second picker taking over picking for the first picker), the autonomous vehicle 200 may require the second worker to log in to the autonomous vehicle 200 (e.g., via the touch screen of electronic device 211 in FIG. 2A) prior to the autonomous vehicle 200 providing guidance as to the next operation performed by the second worker.

In some implementations, at least a portion of the approaches described herein may be realized by instructions that upon execution cause one or more processing devices to carry out the processes and functions described herein. Such instructions may include, for example, interpreted instructions such as script instructions, or executable code, or other instructions stored in a non-transitory computer readable medium.

The network interface 238 may be configured to receive and transmit messages and/or instructions. The network interface 238 may be a wireless network interface capable of receiving commands and information from the analytics server and sending information (e.g., product locations) to the analytics server via wireless signals.

The network interface 238 may be configured to process signals from the analytics server and/or other autonomous vehicles in the warehouse. The network interface 238 may be, for instance, an Ethernet card, a serial communication device, e.g., an RS-232 port, and/or a wireless interface device, e.g., an 802.11 card, a 3G wireless modem, or a 4G wireless modem.

FIG. 2C shows the autonomous vehicle 200 configured with multiple containers 228, according to an embodiment. The autonomous vehicle 200 may display on the screen of electronic device 211 instructions for a picker 224. The instructions may instruct the picker 224 to travel to locations in the warehouse, search for particular bins at a particular location for particular products, and place products in the containers 228 or remove products from the containers 228 (e.g., unload at a particular bin/shelf). The picker 224 may place (or remove) the product in a particular container 228 based on lights 222, 220 indicating the particular container. That is, the lights 222, 220 may illuminate, directing the picker 224 to place (or remove) the product in the indicated container 228. Additionally or alternatively, the electronic device 211 may display instructions instructing the picker 224 which container 228 to place (or remove) the products.

Additionally or alternatively, one or more imaging systems (e.g., scanners) may operate in conjunction with (or replace) lights 220, 222. The imaging system may be used to measure the dimensions of products as the products enter the container. For example, object recognition may be performed to recognize a product and even distinguish it from a hand of a picker 224. As discussed herein, the processor (230 in FIG. 2B) may support object recognition capabilities and/or be capable of executing the imaging system. Additionally or alternatively, the analytics server (122 in FIG. 1) may receive image data (raw data, compressed data) from the imaging system and perform object recognition to determine the dimensions of the products entering the containers 228. The imaging systems may confirm whether a product has been placed into the container. If the product is not placed into the container, the analytics server may determine that the product is shorted.

The display and/or speaker of electronic device 211 may instruct the picker 224 to place the product directly on the autonomous vehicle 200. In such a scenario, the picker 224 may not load or operate the autonomous vehicle 200 with four containers 228. Rather, the picker 224 may load the autonomous vehicle 200 with two containers 228, for instance, and reserve space on the autonomous vehicle 200 for large or bulky products.

III. Illustrative Methods of Operation

Figure 3:
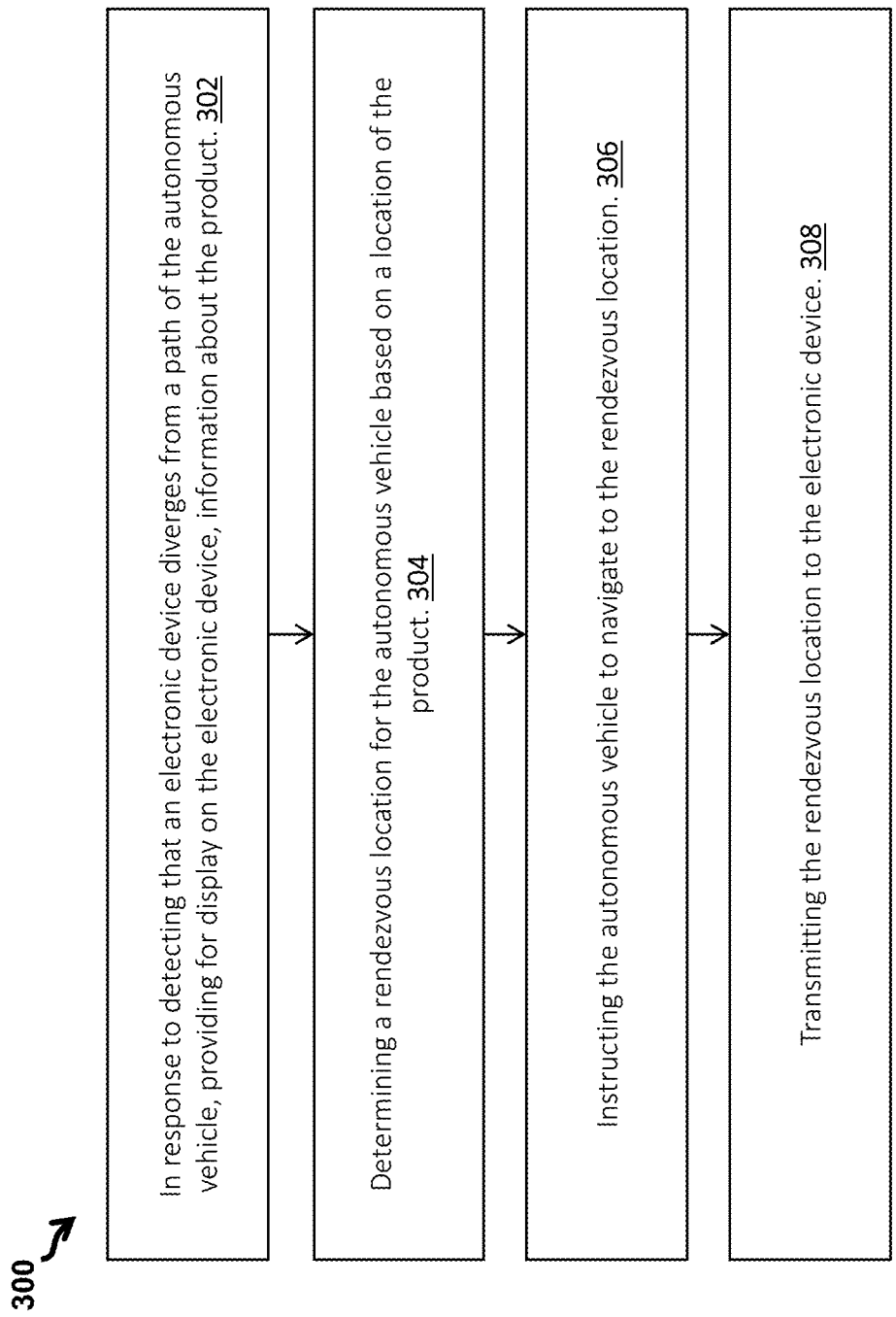
FIG. 3 shows execution steps of a method for dynamically routing an autonomous vehicle, according to an embodiment.

FIG. 3 shows steps of executing a method 300 for dynamically routing an autonomous vehicle, according to an embodiment and displaying the user interfaces (UIs) described herein. The method 300 is described as being implemented via an analytics server associated with a warehouse (or a store). In other embodiments, any processor associated with a warehouse can use the method 300 to display the UIs and/or to route one or more autonomous vehicles accordingly. For instance, instead of a central server, a processor of the autonomous vehicle or an electronic device (e.g., operated by a picker) may execute machine-readable software code to display the UIs described herein and/or route one or more autonomous vehicles.

Moreover, the method 300 may be implemented via more than a single processor or server. For instance, one or more steps may be performed by one server/processor and other steps may be performed by another processor/server. Some embodiments may include additional, fewer, or different operations than those described in the method 300 and shown in FIG. 3. The various operations of the method 300 may be performed by one or more processors executing on any number of computing devices.

In step 302, the analytics server may provide for display on an electronic device, information about a product, in response to detecting that the electronic device diverges from a path of an autonomous vehicle. The analytics server may continuously/periodically monitor the location of different autonomous vehicles and pickers to determine whether a picker has diverged or is diverging from their assigned autonomous vehicle. The analytics server may use a variety of location tracking protocols. For instance, each autonomous vehicle or any electronic devices operated by pickers may include a location aware module or sensor that uses location tracking technology (e.g., GPS, Bluetooth, or beacons) to transmit location information associated with the autonomous vehicle or the picker back to the analytics server.

The analytics server may use the monitored location information to identify that an electronic device associated with a picker diverges (has diverged, will diverge, or is diverging) from a path of the autonomous vehicle. Even though certain aspects of the embodiments described herein discuss these embodiments in the context of whether the picker "diverges" from the path, this term encompasses embodiments where the picker has already diverged, is going to diverge, or is diverging as well. For instance, the analytics server may determine that the picker is located away from the path (has diverged) or is moving away from the path (is diverging).

As used herein, electronic device refers to an electronic device operated by a picker. As described herein, the electronic device may be any electronic device in communication with the autonomous vehicle and/or the analytics server. The picker may use the electronic device to view data associated with the pick route and/or products to be collected. For instance, the picker may use the electronic device to identify a location of the product to be collected, information regarding the product, a status of the pick route (e.g., how many products have been collected and how many remaining products must be collected).

In an example, the electronic device may refer to a mobile device (e.g., mobile phone or tablet computer) having a processor that is in communication with the analytics server and/or the autonomous vehicle via various wired or wireless communication protocols. For instance, the electronic device may be attached (or otherwise connected) to the autonomous vehicle (e.g., electronic device 211 depicted in FIG. 2A). When attached, the electronic device may use various communication protocols to communicate with a processor of the autonomous vehicle and/or act as the processor of the autonomous vehicle.

In another example, the electronic device may refer to any electronic device that is in wireless communication with the autonomous vehicle and/or the analytics server. For instance, a mobile device operated by the picker may use a wireless protocol (e.g., Bluetooth) to communicate with the analytics server and/or the autonomous vehicle. The mobile device may execute an application that is in direct communication with the analytics server and/or a processor of the autonomous vehicle. As a result, the application can display the information discussed herein.

In another example, the electronic device may refer to an electronic device that may communicate with the autonomous vehicle and/or analytics server via both wired and wireless communication protocols. For instance, the electronic device can be attached to the autonomous vehicle (as depicted in FIG. 2A). When detached, the electronic device may use various wireless protocols to communicate with the analytics server and/or the autonomous vehicle. Using the above-described application, the electronic device may display the information described herein.

To determine whether the electronic device diverges from a path of the autonomous vehicle, the analytics server may use at least one of five different configurations. In a first configuration, the analytics server may analyze the pick route for the autonomous vehicle and identify areas that are closed to travel by the autonomous vehicle (e.g., impassable by the autonomous vehicle) using a layout of the building and previously designated areas closed to travel by the autonomous vehicle. For instance, the analytics server may analyze a pick route for an autonomous vehicle that includes 10 products to be collected and 10 corresponding locations. The analytics server may then compare the location of each product, with a layout of the building (e.g., warehouse or store) and determine one or more products that are within an area that has been designated as closed to travel by the autonomous vehicle (e.g., loft area within the warehouse).

Using the methods and systems described herein, the analytics server may continuously/periodically monitor location of the pickers and different autonomous vehicles within the warehouse. Also, the analytics server may monitor a progress associated with each picker. For instance, pickers may be required to use their electronic devices to confirm collecting the assigned products. Using the monitored location of autonomous vehicles and pickers and using a progress associated with each pick route, the analytics server can determine whether the autonomous vehicle has reached an area closed to travel by the autonomous vehicle or is within a defined distance/time threshold to a product that is located within an area closed to travel by the autonomous vehicle. For example, the analytics server analyzes a pick route and determines that product No. 5 is located in an area closed to travel by the autonomous vehicle. When the picker confirms collecting product No. 4, the analytics server determines that the autonomous vehicle is approaching the area closed to travel by the autonomous vehicle. The analytics server may use the location of product No. 4 and a projected walking speed of the picker and/or the autonomous vehicle to determine when the autonomous vehicle is within a threshold distance to the area closed to travel by the autonomous vehicle.

In a second configuration, the analytics server may use one or more sensors associated with the autonomous vehicle to determine whether the autonomous vehicle is within (e.g., is moving towards) an area closed to travel by the autonomous vehicle. A non-limiting example of "impassable" or "closed to travel" may include areas in which maneuvering is difficult for the autonomous vehicle, such as carpeted areas. A sensor in communication with the autonomous vehicle and/or the analytics server may identify such areas and notify the analytics server that the autonomous vehicle is entering (or has entered) an area closed to travel by the autonomous vehicle. The analytics server may also determine whether the autonomous vehicle is moving towards or approaching the area closed to travel. Using the monitored location of the autonomous vehicle, the analytics server may determine whether the autonomous vehicle is moving towards an area that is closed off (e.g., moving towards and is within a defined proximity to the closed area).

In some configurations, the product may be located in an area that is closed to travel to the autonomous vehicle. Alternatively, the product may not be located within an area that is impassable or closed off to the autonomous vehicle. However, the autonomous vehicle's route towards the product may include an area that is impassable or closed to travel. As a result, the autonomous vehicle may use the methods and systems described herein to inform the picker to diverge from the autonomous vehicle and collect the product.

In a third configuration, the analytics server may receive an input from the autonomous vehicle or the electronic device that the picker would like to walk towards and collect the product without the autonomous vehicle. The picker may sometimes decide that an area closed to travel by the autonomous vehicle due to an unforeseen condition that may not be detectable to the analytics server (e.g., oil spill in an aisle). In another example, the picker may need additional assistance. For instance, the picker may use the electronic device to request an additional picker because the product is too large. The picker may use a user interface of the electronic device to instruct the autonomous vehicle to stop so that the picker can collect the next product. As will be described below, the analytics server will then instruct the autonomous vehicle to meet the picker at a designated rendezvous location. Upon reaching the area closed to travel by the autonomous vehicle, the picker may detach the electronic device from the autonomous vehicle to utilize as an interface while picking without the autonomous vehicle. Alternatively, an electronic device (e.g., mobile phone, wrist computer) communicates with an autonomous vehicle and/or the analytics server but does not attach or physically connect to the autonomous vehicle.

In a fourth configuration, the analytics server may determine whether the picker has detached the electronic device from the autonomous vehicle. The autonomous device may include one or more sensors that can identify whether the electronic device has been detached from the autonomous vehicle. Additionally or alternatively, the electronic device itself may include a sensor that transmits a notification to the analytics server when the electronic device has been detached from the autonomous vehicle. When the analytics server determines that the electronic device has been detached from the autonomous vehicle, the analytics server determines that the picker is diverging from the autonomous vehicle.

In a fifth configuration, the analytics server may determine whether the electronic device diverges from a path of the autonomous vehicle using location information of the electronic device and the autonomous device. As described above, the analytics server may monitor location of the electronic device, which is operated and associated with the picker (therefore identifies the location of the picker) and the autonomous vehicle. When the location of the electronic device is further away from a location of the autonomous vehicle and/or when the location of the electronic device indicates that it is deviating from the autonomous vehicle in a manner that satisfies a distance or rate threshold, the analytics server determines that the electronic device has diverged from the autonomous vehicle.

Upon identifying that the electronic device diverges from the autonomous vehicle, the analytics server may present data associated with a product to be collected on the electronic device. The analytics server may first determine (e.g., using a file that includes the pick route and the pick list) the product to be collected. The analytics server may then display the data needed for the picker to locate and collect the product. For instance, the analytics server may instruct the application executing on the electronic device to display an image of the product and/or identifying information associated with the product (e.g., 2-56×½" Machine Screws/Phillips/Pan Head/18-8 Stainless Steel/Black Oxide). The analytics server may also display location information associated with the product (e.g., bin number, isle number, or identification of other products near the product to be collected), name, or any other information associated with the product.

The analytics server may display location information associated with the product using an augmented reality (AR) protocol. For instance, the analytics server may display an AR overlay on images received via a camera of the electronic device where the overlay includes visual indicators (e.g., arrows) guiding the picker towards the product to be collected.

The analytics server may also provide one or more input elements allowing the picker to confirm collection of the product. For instance, the analytics may display an input element (e.g., radio button, text input, or a clickable button) which can be used to confirm that the product (located within the area closed to travel by the autonomous vehicle) has been collected. In some configuration, the analytics server may provide a visual matching application, such that the picker can use to submit an image of the collected product (captured via a camera of the electronic device). The analytics server may then determine whether the received image matches an image of the product and may confirm that the correct product has been collected by the picker. In another non-limiting example, the electronic device may include a visual input element (e.g., barcode scanner). The analytics server may match a barcode associated with the product to be collected with a barcode image received via the electronic device to confirm collection of the product.

In step 304, the analytics server may determine a rendezvous location for the autonomous vehicle based on a location of the product. The rendezvous location represents an ideal location for the picker to rejoin the autonomous vehicle and deposit the products(s) collected within the area closed to travel by the autonomous vehicle.

The analytics server may identify the rendezvous location at any time. For instance, as discussed above, the analytics server may preplan and identify areas closed to travel by the autonomous vehicle within a pick route before the autonomous vehicle and/or the picker start the pick route or before the picker diverges from the autonomous vehicle. Therefore, the analytics server may pre-determine the rendezvous location.

In some configurations, the analytics server may determine the rendezvous location when the autonomous vehicle has reached an area closed to travel by the autonomous vehicle or when the picker confirms collecting the product. In this way, the analytics server may also consider traffic generated by other autonomous vehicles and other pick routes in progress, such that the rendezvous location is dynamically optimized and does not interfere with other pickers and/or autonomous vehicles.

As discussed above, the analytics server may monitor each picker's activity and work progress and may determine when a picker has completed task(s) within the area closed to travel by the autonomous vehicle. When the picker has completed the task(s), the analytics server may determine an optimized rendezvous location for the picker to continue operations using the autonomous vehicle. In some configurations, the rendezvous location may be the same location where the picker diverged from the autonomous vehicle. For instance, the rendezvous location may be the same location where the autonomous vehicle stopped before the picker detached the electronic device and walked towards the area closed to travel by the autonomous vehicle to collect the product. As a result, the analytics server may instruct the autonomous vehicle to not move and await the return of the picker.

In some configurations, it may be more efficient for the picker to meet the autonomous vehicle at a different location than where the picker left it. As a result, the analytics server may identify an ideal rendezvous location based on specific location of the products to be collected within the area closed to travel by the autonomous vehicle, location of the next product to be collected, location of the picker, projected walking time of the picker to the rendezvous location, traffic caused by other autonomous vehicles and their corresponding pick routes, and projected collection time to determine the optimized rendezvous location and to minimize the picker's walking time to the rendezvous location.

When identifying the rendezvous location, the analytics server may also consider attributes associated with the area closed to travel by the autonomous vehicle. For instance, certain areas closed to travel by the autonomous vehicle may have only one access point, such as an enclosed area with only one door or entryway. Other areas closed to travel by the autonomous vehicle may have multiple access points, such as an aisle within a warehouse. In another example, an area closed to travel by the autonomous vehicle may have multiple access points, such as an open area that is heavily congested with other autonomous vehicles or has flooring in which the autonomous vehicle cannot maneuver. The analytics server may compare a walking time (or distance) of the picker (after collecting the product) with possible access points for the area closed to travel by the autonomous vehicle. As a result, the analytics server may identify an optimal rendezvous location and/or an autonomous vehicle with respect to a particular picker's location. In another example, the analytics server may select an access point that is closest to the next product to be collected as the rendezvous location.

In some embodiments, a picker may be required to collect multiple products within multiple areas of an area closed to travel by the autonomous vehicle or multiple areas closed to travel by the autonomous vehicle (e.g., collect two products that are both located within an aisle that is closed to travel by the autonomous vehicle or collect two products that are located two different aisles both of which have been designated as closed to travel by the autonomous vehicle). The analytics server may consider projected time and location of the products when determining the rendezvous location. The analytics server may revise the workflow in accordance with the picker's required picks. For instance, the default workflow is to collect the item, deposit the item, and confirm collection. However, when the picker is collecting multiple product, the flow may be revised to collect the first product, collect the second product, deposit both products, and confirm both collections.

In some embodiments, the analytics server may determine that it is more efficient for the picker to meet a different autonomous vehicle at the rendezvous location. The analytics server may dynamically route and re-route pickers and autonomous vehicles to increase efficiency. For instance, the picker may diverge from an autonomous vehicle and walk towards a product. However, the analytics server may dynamically identify that the picker should meet another autonomous vehicle at a rendezvous location. As a result, the analytics server may reroute the first autonomous vehicle and assign it to a different picker. The analytics server then transmits a notification to the electronic device informing the picker that the picker has been assigned to a new autonomous vehicle. Using this dynamic (and sometimes in real time) rerouting method, the analytics server may increase efficiency such that pick routes and collection of items are optimized rather than a picker staying with the same autonomous vehicle. Moreover, the analytics server can reduce picker walking time and/or autonomous vehicle idle time (e.g., the time that the autonomous vehicle is unused while the picker is within the area closed to travel by the autonomous vehicle).

When identifying the rendezvous location, the analytics server may consider a weighted arrangement (or combination) of factors including: the route determined for autonomous vehicle (or other autonomous vehicles), the pick lists associated with the autonomous vehicle (or other autonomous vehicles), the pick list priority (e.g., based on customer priority, deadline priority, or perishable product priority), the picker's current location, autonomous vehicles' current location, picker's assignment to an autonomous vehicle (and the current route of the autonomous vehicle), picker's progress in completing their tasks, picker's projected location, autonomous vehicles' projected location, nearest autonomous vehicle to a picker in time based on the picker's walking speed, nearest autonomous vehicle in urgency, nearest autonomous vehicle in distance, battery level, orders already placed on an autonomous vehicle, priority pickers (e.g., based on skillset for example driving a forklift, or handling hazardous material), products to be picked that can be prioritized over other pickers and/or picking routes.

The analytics server may statistically or algorithmically determine weights for the factors based on, for example, minimizing the effect of re-routing any autonomous vehicle on high priority orders, minimizing the time of a picker picking products in the warehouse, minimizing the number of orders delayed (based on maximum time remaining and walking time), among others. Additionally or alternatively, a user (such as a supervisor) may input weights for each of the factors in the weighted arrangement.

In identifying the rendezvous location or selecting the optimal second autonomous vehicle from among the plurality of autonomous vehicles, the analytics server may consider the picker's walking time. The walking time may be based on a distance to a rendezvous location or other locations (e.g., a location of a subsequent pick for a product). For instance, the analytics server may convert the distance within the warehouse into time units based on the picker's walking pace. The picker's walking pace may be specific to that particular picker (obtained by the analytics server via metrics retrieved from wearable technology, historic picker order completion time information), or an average walking pace.

In embodiments where the analytics server identifies a second autonomous vehicle, the analytics server may identify the second autonomous vehicle based on comparing distances to rendezvous locations (or product locations in the warehouse) and associated walking times to each of the autonomous vehicles in the plurality of autonomous vehicles. The analytics server may also consider the second autonomous vehicle's outstanding tasks, such as pick tasks, unload tasks, or pack tasks.

The analytics server may also identify an autonomous vehicle from a plurality of autonomous vehicles active within the warehouse in response to identifying an autonomous vehicle with a higher priority pick list than a pick list associated with an autonomous vehicle currently assigned to a picker. A pick list may be of higher priority if the products in the pick list are perishable. Additionally or alternatively, a pick list may be of higher priority if the order associated with the products is approaching a deadline.

For example, the analytics server may compute a maximum time remaining (the time remaining to complete the order before a deadline) for each order on an autonomous vehicle based on a current time. The analytics server may determine that an order is completed (fulfilled) based on picking each of the products identified in the order. Additionally or alternatively, the maximum time remaining may include the time to pick and/or pack the order (e.g., prepare the order for shipment by unloading the products from the autonomous vehicle and packing the products for shipment). The maximum remaining time for the order may also depend on a shipment by time (e.g., a time that the order may be packed and ready to be shipped such that the order arrives to the customer by the promised time). Additionally or alternatively, the maximum remaining time for the order may depend on a carrier cut-off time (e.g., each carrier may set a timing deadline based on the last time of the day the carrier will be at the warehouse).

In identifying the rendezvous location and/or the second autonomous vehicle, the analytics server may also consider subsequent picks in a pick list. For example, the analytics server may determine that a subsequent pick associated with an autonomous vehicle is not optimal for the picker. The subsequent pick may not be optimal for the picker if the subsequent pick is located far away. For example, the analytics server may determine that the subsequent pick is far away based on a walking time. Additionally or alternatively, the subsequent pick may not be optimal for the picker if the subsequent pick is too heavy for the picker. For example, the analytics server may compare the product weight to one or more picker attributes. Picker attributes may include a weight limit associated with each particular picker. Additionally or alternatively, the subsequent pick may not be optimal for the picker if the subsequent pick requires special handling. For example, the analytics server may compare a product attribute to a picker attribute. Product attributes may include hazard attributes, fragile attributes, or special handling attributes (e.g., forklift). Picker attributes may include picker skills such as operating a forklift and/or being certified to picker hazardous and/or fragile products.

In step 306, the analytics server may instruct the autonomous vehicle to navigate to the rendezvous location. Upon identifying the rendezvous location and detecting that the electronic device has been detached from the autonomous vehicle, the analytics server may navigate the autonomous vehicle to the rendezvous location. The instruction may cause the autonomous vehicle to start navigating to the rendezvous immediately or based on a time delay calculated by the analytics server. For instance, in some embodiments, the instructions may be transmitted to the autonomous vehicle and the autonomous vehicle may immediately start navigating to the rendezvous location. In some other embodiments, the instruction may include a time threshold (e.g., 2 minutes), such that the autonomous vehicle navigates to the rendezvous after the time threshold has been satisfied.

Additionally or alternatively, the instruction may include a secondary threshold, such that the autonomous vehicle navigates to the rendezvous location when the secondary threshold has been satisfied. For instance, the analytics server may instruct the autonomous vehicle to start navigating to the rendezvous location when the picker's location is within a threshold distance to the rendezvous location. For instance, the autonomous vehicle may not start navigating towards the rendezvous location unless the picker has started moving towards the rendezvous location with the electronic device and is within a time and/or distance thresholds (e.g., 1 minute or 50 feet) of the rendezvous location.

Additionally or alternatively, the analytics server may instruct the autonomous vehicle to navigate to the rendezvous location based on a status of the electronic device. The analytics server and/or the autonomous vehicle may monitor a status of the electronic device and determine whether the electronic device is attached or detached from the autonomous vehicle. As a result, the analytics server either transmits the instruction to the autonomous vehicle upon receiving an indication that the picker has detached the electronic device or transmits the instruction along with a secondary threshold, such that the autonomous vehicle does not move towards the rendezvous location until the autonomous vehicle determines that the electronic device has been detached.

The analytics server may also cause the autonomous vehicle to display a graphical indicator associated with the picker, such as the picker's name, photo, avatar, a number (associated with the picker or the pick route), and the like, to prevent other pickers from accidentally using the autonomous vehicle. The graphical indicator may also be a notification to the picker associated with the autonomous vehicle that the autonomous vehicle is being re-routed. The graphical indicator may also display the rendezvous location. For example, the graphical indicator may indicate an aisle, bin number, or general direction. The graphical indicator may also display a map of the warehouse and present a high-level path through the aisles of the warehouse to navigate the picker to the subsequent location in the warehouse.

Additionally or alternatively, the analytics server may cause the autonomous vehicle to display a colored light indicating whether the autonomous vehicle is already assigned to a picker and/or a pick route (e.g., green light indicating a "free" autonomous vehicle and a red light indicating that the autonomous vehicle is "is use.").

In the embodiments where the analytics server selects a secondary autonomous vehicle to navigate to the rendezvous location, the analytics server may re-route both the first and secondary autonomous vehicles (and/or the first and/or second pickers) to the rendezvous location (or other location). That is, the analytics server may transmit instructions to both autonomous vehicles to meet at different rendezvous locations. In embodiments where two autonomous vehicles are assigned to the same rendezvous location (e.g., when the product is too heavy and the picker has requested help), the secondary autonomous vehicle is also instructed to navigate to the rendezvous location and display a graphical indicator associated with the product and/or the picker.

Using the indicator, the analytics server ensures that pickers use the autonomous vehicle that has been assigned to them. However, in the event that a picker starts using an autonomous vehicle that has not been assigned to that picker, the analytics server may dynamically re-route the autonomous vehicle and update its pick route to match the picker. For instance, a picker may diverge from autonomous vehicle number 123 and walk towards a product within an area closed to travel by the autonomous vehicle. Upon reaching the rendezvous location, the picker may erroneously attach their electronic device to autonomous vehicle number 125 (instead of autonomous vehicle number 123). As a result, the analytics server may dynamically update the pick route for autonomous vehicle number 125 to match the pick route for autonomous vehicle number 123 and vice versa. The analytics server may also notify the picker assigned to the autonomous vehicle number 125 and instruct that picker to meet autonomous vehicle number 123 at the rendezvous location. In this way, the analytics server reduces inefficiencies, such that both pickers can continue collecting products.

In step 308, the analytics server may transmit the rendezvous location to the electronic device to route the picker. The analytics server may transmit an electronic notification to the electronic device displaying the rendezvous location and, if being assigned to a new autonomous vehicle, an identifier of the new autonomous vehicle. For instance, the electronic device may display real time directions that can navigate the picker to the rendezvous location. In another example, the system may display the directions and/or rendezvous location(s) using digital displays within the warehouse.

The directional information may be displayed on a display (e.g., electronic device 211 in FIG. 2C, a display on a wearable device or mobile device operated by the picker, or a display in the warehouse). The directional information may provide information regarding the route (or reroute) from the perspective of the picker traveling to the rendezvous location. For example, the directional information may include sequential directions navigating the picker to the rendezvous location. These directions may be updated in real time based on the picker's real time movement and change of location.

In the embodiments, where the routing of the autonomous vehicle is analyzed before the autonomous vehicle reaches an area that is closed off (or otherwise impassable), the analytics server may display the notification on a display of the autonomous vehicle (e.g., electronic device before it is detached) before the picker diverges from the autonomous vehicle. For instance, the electronic device (while attached to the autonomous vehicle) may display "please detach this device and walk to aisle No. 5, collect product XYZ, and walk to aisle No. 6 and meet the same autonomous vehicle."

The autonomous vehicle may continue the pick route when the analytics server (or a processor of the autonomous vehicle) receives an indication that the picker has rejoined the autonomous vehicle at the rendezvous location. For instance, when the analytics server receives an indication that the picker has re-attached the electronic device to the autonomous vehicle at the rendezvous location, the analytics server may instruct the autonomous vehicle to navigate towards the next product within the pick list. In another example, the picker may confirm that the picker has deposited the product (collected in the area closed to travel by the autonomous vehicle) and is ready to move and collect the next product within the pick list using the UI provided on the electronic device.

Figure 4:
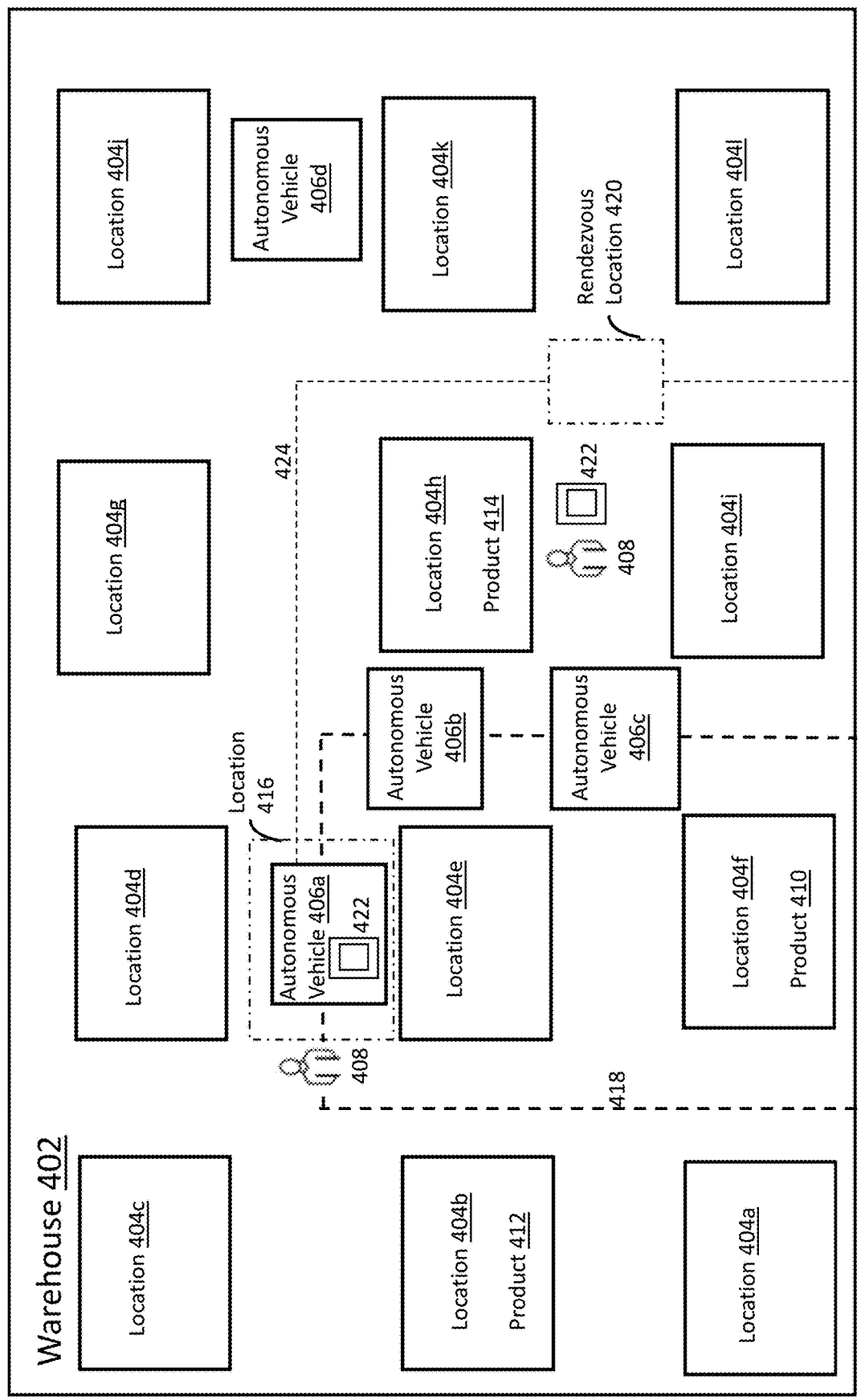
FIG. 4 shows a non-limiting example of routing an autonomous vehicle.

FIG. 4 illustrates a diagram of a path 418 of an autonomous vehicle 406a and a picker 408 through a warehouse 402 with various pick locations 404a-l (collectively pick location 404) to select or retrieve products 410-414 associated with one or more orders. The autonomous vehicle 406a can execute the instructions to collect the products in a determined order. Features shown in FIG. 4 do not deviate from the features depicted and concepts described in FIG. 1B. Therefore, some of the description will not be repeated.

When the analytics server determines that the autonomous vehicle 406a (at location 416) is located within a distance threshold away from product 414, the analytics server determines that product 414 is within an area closed to travel by the autonomous vehicle because autonomous vehicles 406b, 406c have created traffic congestion within the path 418 (e.g., closed off to the autonomous vehicle 406a). At location 416, the analytics server may display a prompt on a picker's electronic device 422 (e.g., detachable display of the autonomous vehicle 406a or any other electronic device operated by the picker 408). The prompt notifies the picker 408 to detach the device 422 from the autonomous vehicle 406a and walk to collect the product 414 independently of the autonomous vehicle 406a. The server may provide instructions to the electronic device 422 that may include a location of the product, an identifier of the product, an image of the product, and/or a size reference of the product. Additionally or alternatively, the analytics server may display, on the electronic device 422, a second path (other than the path 418) for the picker 408 to reach the product 414.

In another example, the picker 408 may survey the area and determine that the autonomous vehicles 406b and 406c have created a traffic congestion that impedes the autonomous vehicle 406a from navigating freely. As a result, the picker 408 may then use the electronic device 422 to instruct the autonomous vehicle 406a that the picker 408 would like to collect the product 414 on their own and further to meet the picker 408 at another location (e.g., rendezvous location 420). As a result, the autonomous vehicle 406a may dynamically revise its route based on the input received from the picker 408.

After determining that the picker 408 has diverged from the autonomous vehicle 406a (e.g., when the analytics server determines that the picker 408 is walking towards the product 414 or when a processor of the electronic device 422 or the autonomous vehicle 406a notifies the analytics server that the electronic device 422 has been detached from the autonomous vehicle 406a), the analytics server may instruct the autonomous vehicle 406a to navigate along a path 424 to the rendezvous location 420. Upon the picker 408 confirming that the picker 408 has collected the product 414, the analytics server may display navigational instructions on the electronic device 422 and guide the picker 408 towards the rendezvous location 420.

When the analytics server determines that the electronic device 422 has been re-attached to the autonomous vehicle

406a at the rendezvous location 420, the analytics server may instruct the autonomous vehicle 406a to continue with the path 424. As described herein, the electronic device 422 may be a secondary device in communication with the autonomous vehicle 406a. Therefore, the electronic device 422 does not always have to be re-attached to the autonomous vehicle 406a. The electronic device 422 may also be re-associated with the autonomous vehicle 406a (e.g., back within a defined proximity to the autonomous vehicle 406a).

Alternatively, the analytics server may instruct the autonomous vehicle 406a to continue along the path 418, as originally planned. For instance, as the autonomous vehicles 406b and 406c move along their respective paths (not shown), the area may no longer be impassable or closed to travel by the autonomous vehicle 406a. As a result, the analytics server may instruct the autonomous vehicle 406a to rejoin the path 418.

In another example, the analytics server may instruct the autonomous vehicle 406a to stop at the location 416 and may further instruct the picker 408 to return to the location 416 (instead of the rendezvous location 420) and deposit the product 414.

In another example, the analytics server may instruct the autonomous vehicle 406d to navigate towards the rendezvous location 420. The analytics server may then instruct the picker 408 to walk towards the rendezvous location 420 and deposit the product 414 onto the autonomous vehicle 406d (instead of the autonomous vehicle 406a). Moreover, the analytics server may dynamically reroute the autonomous vehicle 406a to be assigned to another picker.

In another example, the picker 408 may deny collecting the product 414 because product 414 is too heavy. The picker 408 may use an interface of the electronic device 422 to request additional help. As a result, the analytics server may instruct the autonomous vehicles 406a and 406d to navigate to the rendezvous location 420. The analytics server may also instruct the picker assigned to the autonomous vehicle 406d to meet the picker 408 at the location of the product 414. When the pickers confirm collecting the product 414, the analytics server instructs them to deposit the product 414 onto the autonomous vehicle 406a waiting for them at the rendezvous location 420.

In an embodiment, a method comprises in response to detecting that an electronic device diverges from a path of the autonomous vehicle, providing, by a processor, for display on the electronic device, information about the product; determining, by the processor, a rendezvous location for the autonomous vehicle based on a location of the product; instructing, by the processor, the autonomous vehicle to navigate to the rendezvous location; and transmitting, by the processor, the rendezvous location to the electronic device.

Detecting that the electronic device diverges from the path of the autonomous vehicle may comprise determining, by the processor, that at least one of the location of the product is in an area closed to travel by the autonomous vehicle or the autonomous vehicle is approaching the area closed to travel by the autonomous vehicle.

Determining the location of the product is at the area closed to travel by the autonomous vehicle may comprise identifying, by the processor, the area closed to travel by the autonomous vehicle in response to obtaining a previous product.

Determining the rendezvous location may comprise selecting, by the processor, an access point from amongst a plurality of access points to the area closed to travel by the autonomous vehicle based on proximity to the location of the product.

Determining the rendezvous location further may comprise selecting, by the processor, an access point from amongst a plurality of access points to the area closed to travel by the autonomous vehicle based on proximity to a subsequent product to be obtained by the autonomous vehicle.

The autonomous vehicle may be a first autonomous vehicle and wherein the area closed to travel by the first autonomous vehicle due to a presence of a second autonomous vehicle in the area closed to travel.

Detecting that the electronic device diverges from the path of the autonomous vehicle may comprise determining, by the processor, that the electronic device is located at a distance away from the autonomous vehicle that satisfies a distance threshold.

Detecting that the electronic device diverges from the path of the autonomous vehicle may comprise providing, by the processor, for display on the electronic device an instruction to leave the path of the autonomous vehicle.

The method may further comprise determining, by the processor, that the electronic device is detached from the autonomous vehicle.

The method may further comprise providing, by the processor, for display on the electronic device, instructions for obtaining a product on a second path diverging from the path.

The method may further comprise transmitting, by the processor to the electronic device, walking directions to the rendezvous location.

The autonomous vehicle may be a first autonomous vehicle, the method may further comprise in response to receiving a notification from the electronic device that the product was not obtained at the location of the product, instructing, by the processor, a second autonomous vehicle to navigate proximate to the location of the product.

The information about the product may comprise at least one of the location of the product, an identifier of the product, an image of the product, or a size reference of the product.

In another embodiment, a system may comprise an autonomous vehicle, an electronic device in communication with the autonomous vehicle, a server in communication with the autonomous vehicle and the electronic device, the server configured to: in response to detecting that the electronic device diverges from a path of the autonomous vehicle, provide, for display on the electronic device, information about the product; determine a rendezvous location for the autonomous vehicle based on a location of the product; instruct the autonomous vehicle to navigate to the rendezvous location; and transmit the rendezvous location to the electronic device.

Detecting that the electronic device diverges from the path of the autonomous vehicle may comprise at least one of determining that the location of the product is in an area closed to travel by the autonomous vehicle, determining that the electronic device is located at a distance away from the autonomous vehicle that satisfies a distance threshold, or determining that the electronic device detached from the autonomous vehicle.

The server may be further configured to identify that the area closed to travel by the autonomous vehicle in response to obtaining a previous product.

The server may be further configured to select an access point from amongst a plurality of access points to the area closed to travel by the autonomous vehicle based on proximity to the location of the product.

The server may be further configured to select an access point from amongst a plurality of access points to the area closed to travel by the autonomous vehicle based on proximity to a subsequent product to be obtained by the autonomous vehicle.

The server may be further configured to provide for display on the electronic device instructions for obtaining a product on a second path diverging from the path.

In another embodiment, a method comprises transmitting, by a processor of an autonomous vehicle to a server, a location of the autonomous vehicle on a path; providing, by the processor, for display on an electronic device attached to the autonomous vehicle, an instruction for obtaining a product on a second path diverging from the path; navigating, by the processor, the autonomous vehicle to a rendezvous location; and identifying, by the processor, that the electronic device has re-attached to the autonomous vehicle.

The processor may navigate the autonomous vehicle to the rendezvous location in response to the electronic device being detached from the autonomous vehicle.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   determining, by a processor, that a location of at least one product to be collected is in an area closed to travel by an autonomous vehicle;
   determining the location of the at least one product to be collected within the area closed to travel by the autonomous vehicle;

providing, by the processor, for display on an electronic device, information about the at least one product to be collected within the area closed to travel by the autonomous vehicle;

in response to detecting that the electronic device diverges from a path of the autonomous vehicle, determining, by the processor, a rendezvous location for the autonomous vehicle to meet the electronic device based on a current location of the electronic device relative to the location of the at least one product to be collected;

instructing, by the processor, the autonomous vehicle to navigate to the rendezvous location; and transmitting, by the processor, the rendezvous location to the electronic device.

2. The method of claim 1, wherein determining the location of the at least one product to be collected is in an area closed to travel by the autonomous vehicle comprises identifying, by the processor, the area closed to travel by the autonomous vehicle in response to obtaining a previous product.

3. The method of claim 1, wherein determining the rendezvous location comprises selecting, by the processor, an access point from amongst a plurality of access points to the area closed to travel by the autonomous vehicle based on proximity to the location of the at least one product to be collected.

4. The method of claim 1, wherein determining the rendezvous location further comprises selecting, by the processor, an access point from amongst a plurality of access points to the area closed to travel by the autonomous vehicle based on proximity to a subsequent product to be obtained by the autonomous vehicle.

5. The method of claim 1, wherein the autonomous vehicle is a first autonomous vehicle and wherein the area closed to travel by the first autonomous vehicle due to a presence of a second autonomous vehicle in the area closed to travel.

6. The method of claim 1, wherein detecting that the electronic device diverges from the path of the autonomous vehicle comprises determining, by the processor, that the electronic device is located at a distance away from the autonomous vehicle that satisfies a distance threshold.

7. The method of claim 1, further comprising:
determining, by the processor, that the electronic device is detached from the autonomous vehicle.

8. The method of claim 1, further comprising:
providing, by the processor, for display on the electronic device, instructions for obtaining the at least one product to be collected on a second path diverging from the path.

9. The method of claim 1, further comprising:
transmitting, by the processor to the electronic device, walking directions to the rendezvous location.

10. The method of claim 1, wherein the autonomous vehicle is a first autonomous vehicle, the method further comprising:
in response to receiving a notification from the electronic device that the at least one product to be collected was not obtained at the location of the at least one product to be collected, instructing, by the processor, a second autonomous vehicle to navigate proximate to the location of the at least one product to be collected.

11. The method of claim 1, wherein the information about the at least one product to be collected comprises at least one of the location of the at least one product to be collected, an identifier of the at least one product to be collected, an image of the at least one product to be collected, or a size reference of the at least one product to be collected.

12. A system comprising:
an electronic device in communication with the autonomous vehicle,
a server in communication with the autonomous vehicle and the electronic device, the server configured to:
determine that a location of at least one product to be collected is in an area closed to travel by the autonomous vehicle;
determine the location of the at least one product to be collected within the area closed to travel by the autonomous vehicle;
provide, for display on an electronic device, information about the at least one product to be collected within the area closed to travel by the autonomous vehicle;
in response to detecting that the electronic device diverges from a path of the autonomous vehicle,
determine a rendezvous location for the autonomous vehicle to meet the electronic device based on a current location of the electronic device relative to the location of the at least one product to be collected; and
instruct the autonomous vehicle to navigate to the rendezvous location;
and transmit the rendezvous location to the electronic device.

13. The system of claim 12, wherein the server is further configured to identify that the area closed to travel by the autonomous vehicle in response to obtaining a previous product.

14. The system of claim 12, wherein the server is further configured to select an access point from amongst a plurality of access points to the area closed to travel by the autonomous vehicle based on proximity to the location of the at least one product to be collected.

15. The system of claim 12, wherein the server is further configured to select an access point from amongst a plurality of access points to the area closed to travel by the autonomous vehicle based on proximity to a subsequent product to be obtained by the autonomous vehicle.

16. The system of claim 12, wherein the server is further configured to:
provide, for display on the electronic device, instructions for obtaining the at least one product to be collected on a second path diverging from the path.

17. A method comprising:
transmitting, by a processor of an autonomous vehicle to a server, a location of the autonomous vehicle on a path of the autonomous vehicle directed to a product location for obtaining a product;
determining that the product location is in an area closed to travel by an autonomous vehicle;
providing, by the processor, for display on an electronic device attached to the autonomous vehicle, an instruction for obtaining the product at the product location on a path diverging from the path of the autonomous vehicle;
determining the product location of the product within the area closed to travel by the autonomous vehicle;
providing, by the processor, for display on an electronic device, information about the product within the area closed to travel by the autonomous vehicle;

determining a rendezvous location for the autonomous vehicle to meet the electronic device based on a current location of the electronic device relative to the location of the product;

navigating, by the processor, the autonomous vehicle to the rendezvous location to meet the electronic device; and identifying, by the processor, that the electronic device has re-attached to the autonomous vehicle.

18. The method of claim 17, wherein the processor navigates the autonomous vehicle to the rendezvous location in response to the electronic device being detached from the autonomous vehicle.

\* \* \* \* \*